US012571369B2

(12) United States Patent　　　(10) Patent No.: US 12,571,369 B2

Hamilton　　　(45) Date of Patent: *Mar. 10, 2026

(54) WIND TURBINE FARM

(71) Applicant: William Larry Hamilton, Houston, TX (US)

(72) Inventor: William Larry Hamilton, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,722

(22) Filed: May 29, 2024

(65) Prior Publication Data

US 2024/0318628 A1　　Sep. 26, 2024

Related U.S. Application Data

(63) Continuation-in-part of application No. 17/737,860, filed on May 5, 2022, now Pat. No. 12,018,656, which is a continuation-in-part of application No. 17/323,849, filed on May 18, 2021, now Pat. No. 11,371,484, which is a continuation-in-part of application No. 16/827,665, filed on Mar. 23, 2020, now Pat. No. 11,041,481.

(60) Provisional application No. 62/891,966, filed on Aug. 27, 2019.

(51) Int. Cl.
　　*F03D 7/02*　　　(2006.01)
　　*F03D 7/04*　　　(2006.01)

(52) U.S. Cl.
　　CPC ........... *F03D 7/0204* (2013.01); *F03D 7/048* (2013.01); *F05B 2260/8211* (2013.01); *F05B*

*2260/84* (2013.01); *F05B 2270/32* (2013.01); *F05B 2270/321* (2013.01)

(58) Field of Classification Search
CPC . F03D 7/048; F03D 9/257; F03D 1/02; F05B 2260/821; F05B 2260/84; F05B 2270/32; F05B 2270/321
See application file for complete search history.

(56) References Cited

U.S. PATENT DOCUMENTS

2006/0131889 A1 * 6/2006 Corten ................... F03D 13/20
　　　　　　　　　　　　　　　　　290/43
2012/0051939 A1 * 3/2012 Marvin ................... F03D 80/85
　　　　　　　　　　　　　　　　　416/244 R
2012/0086214 A1 * 4/2012 Roskey ................... F03D 1/04
　　　　　　　　　　　　　　　　　290/55
2015/0056075 A1 * 2/2015 Birarov ................... F03D 13/20
　　　　　　　　　　　　　　　　　416/1

* cited by examiner

*Primary Examiner* — Yoshihisa Ishizuka

(74) *Attorney, Agent, or Firm* — KALI LAW GROUP, P.C.

(57) ABSTRACT

Wind turbine farms are presented including: a number of steerable wind turbines, where each of the steerable wind turbines includes a turbine diameter and a blade center locus, where each of the steerable wind turbines are separately and axially steerable about a vertical axis to align with one or more prevailing wind directions, where the steerable wind turbines is arranged in one or more modules, where each of the modules is defined by at least two steerable wind turbines, where each of the at least two steerable wind turbines in a module is positioned in a fixed position.

12 Claims, 26 Drawing Sheets

FIG. 2
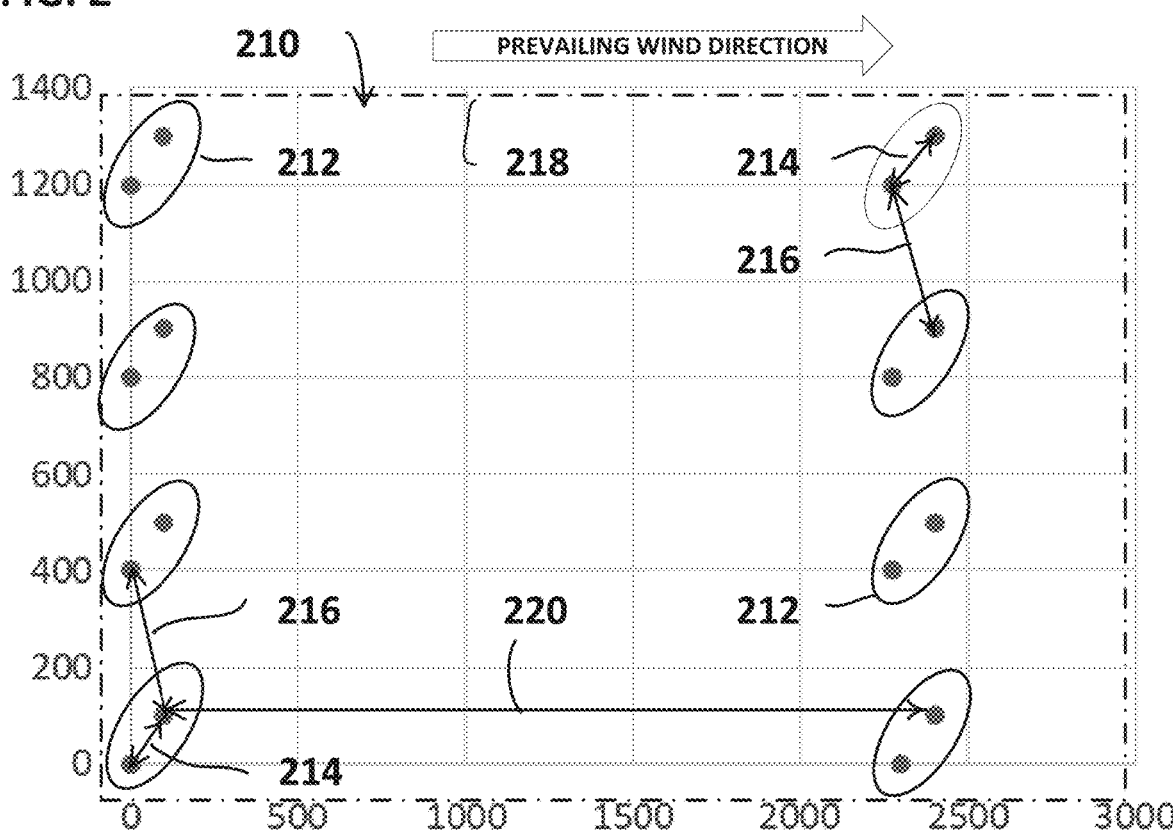
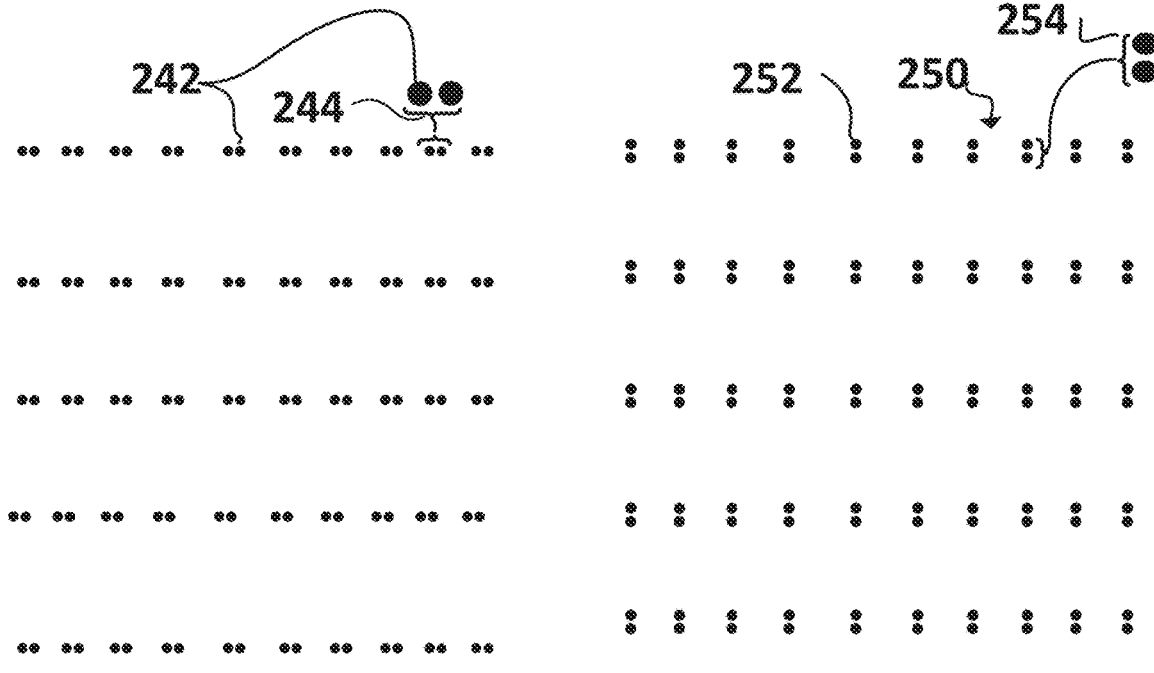

FIG. 8
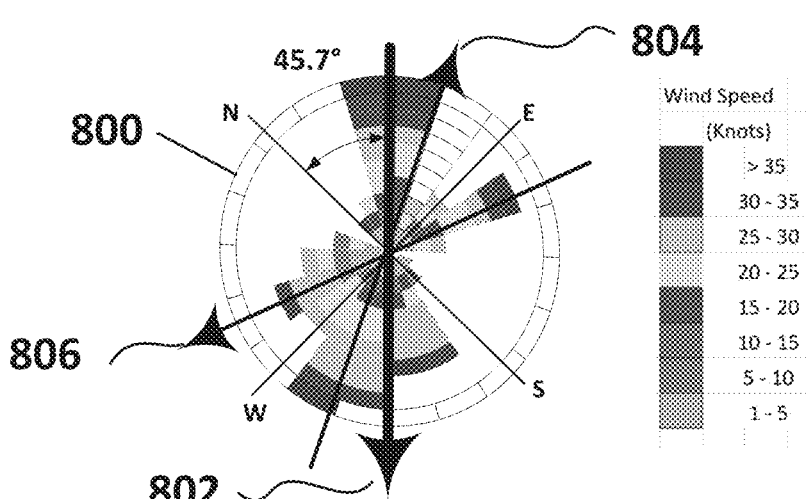
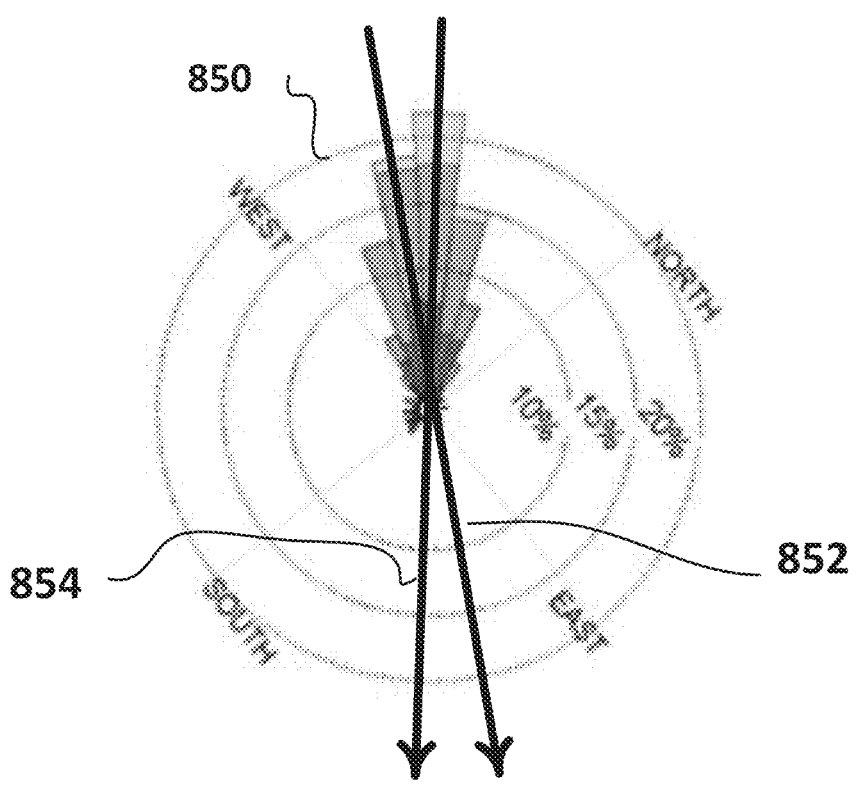

1300A

Top View

1314A

1308A 1302A
1312A

Front View

Side View

1310A

1304A

1300B

Top View

1314B

1302B 1308B     1320     1302B 1302B     1312B 1310B     1304B

Front View     Side View

1300C

1302C

Top View

1314C 1312C     1308C 1302C
1310C     1314C

Front View     Side View

FIG. 14
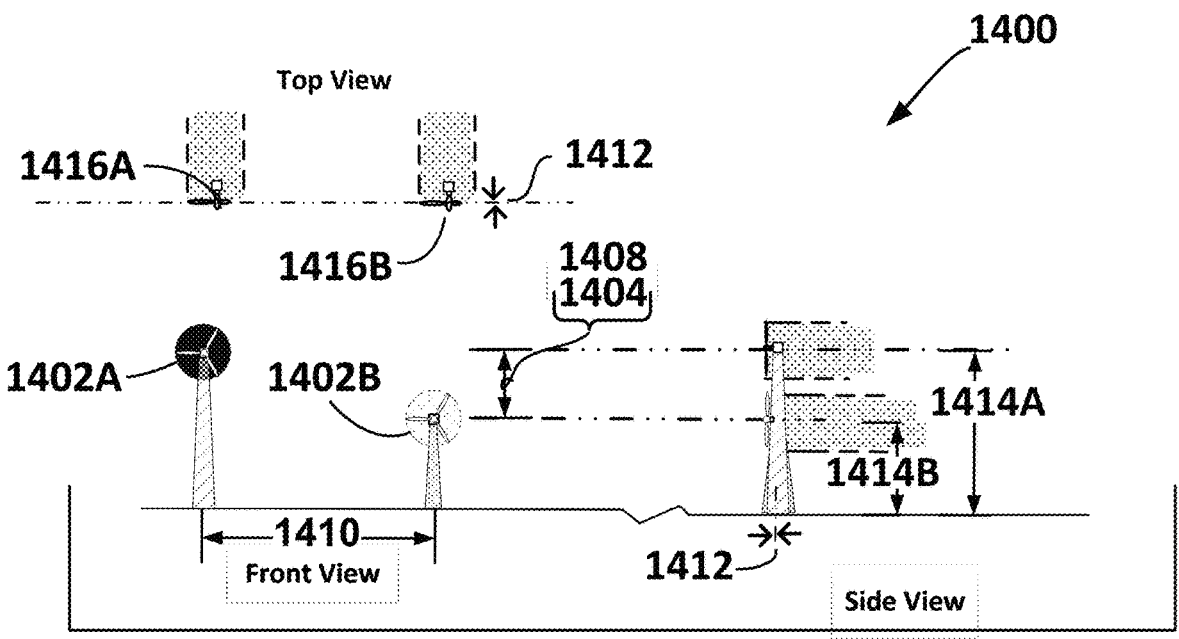
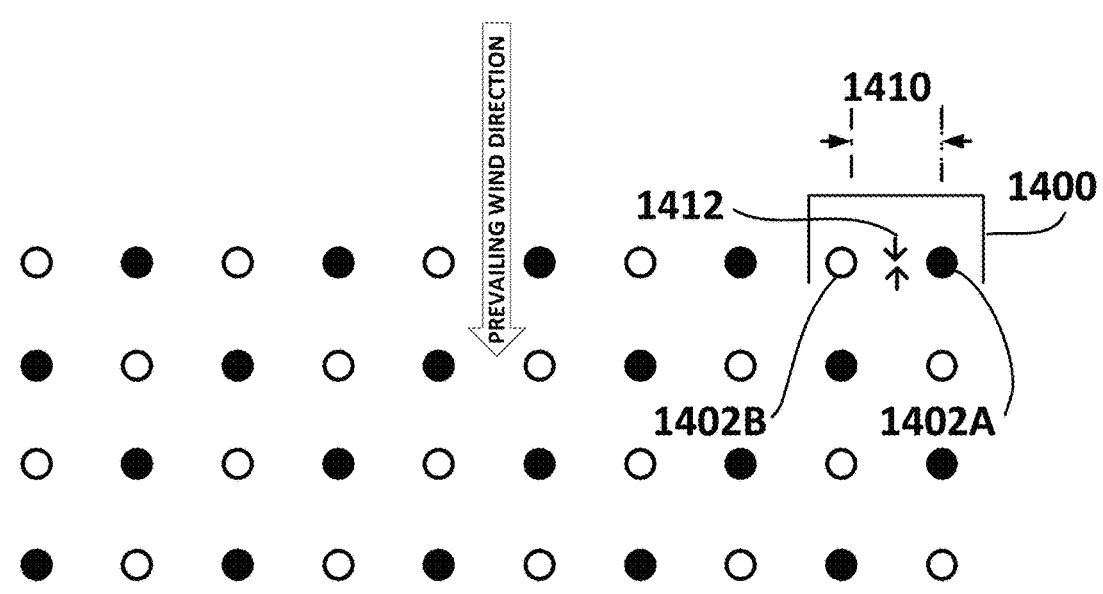

FIG. 15
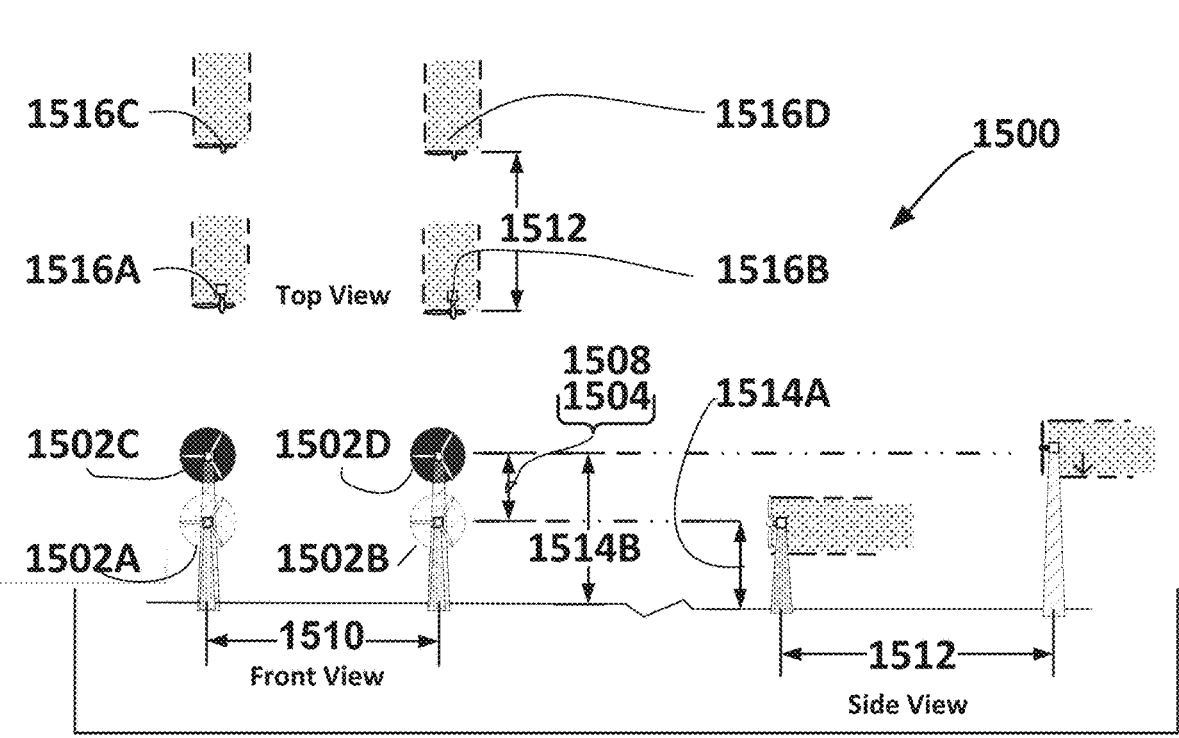
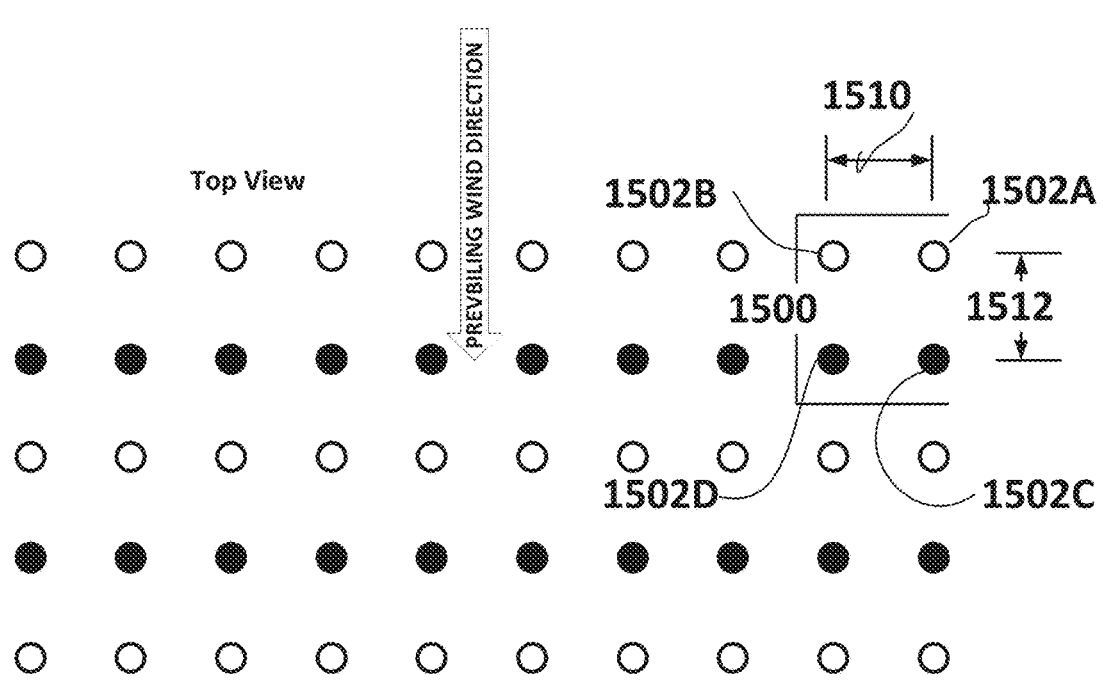

Fig 16
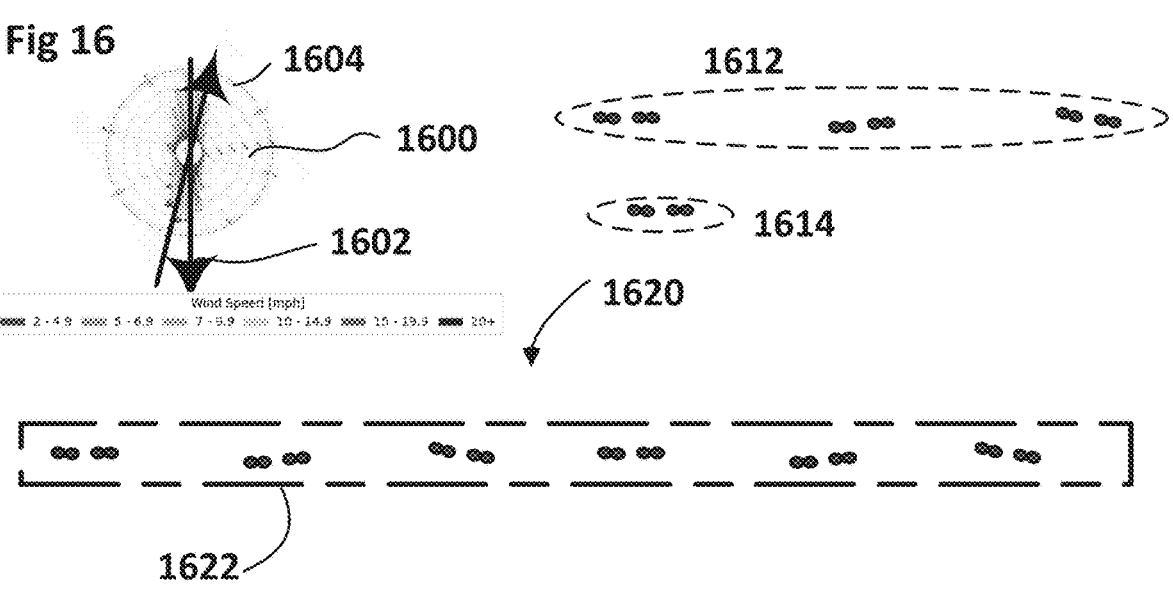
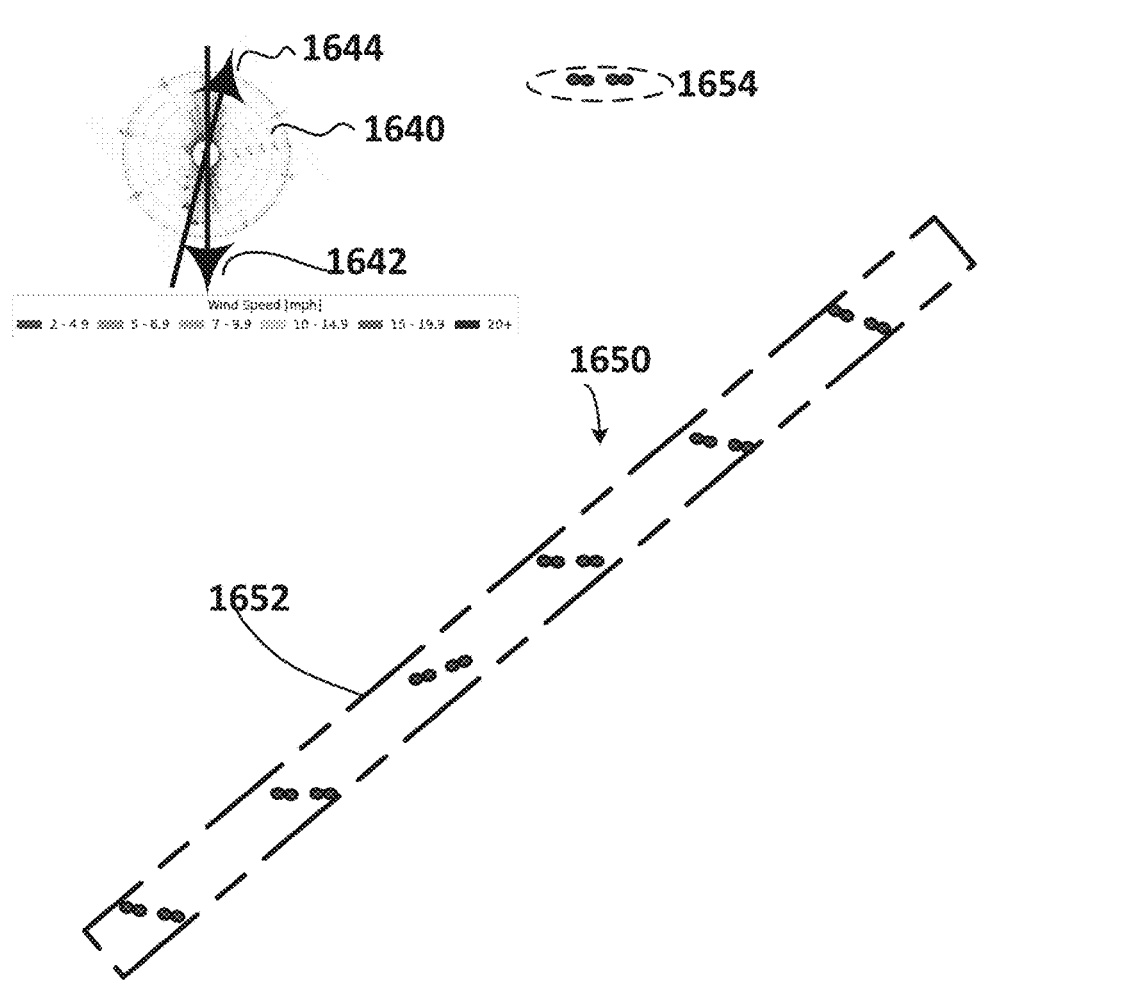

FIG. 19

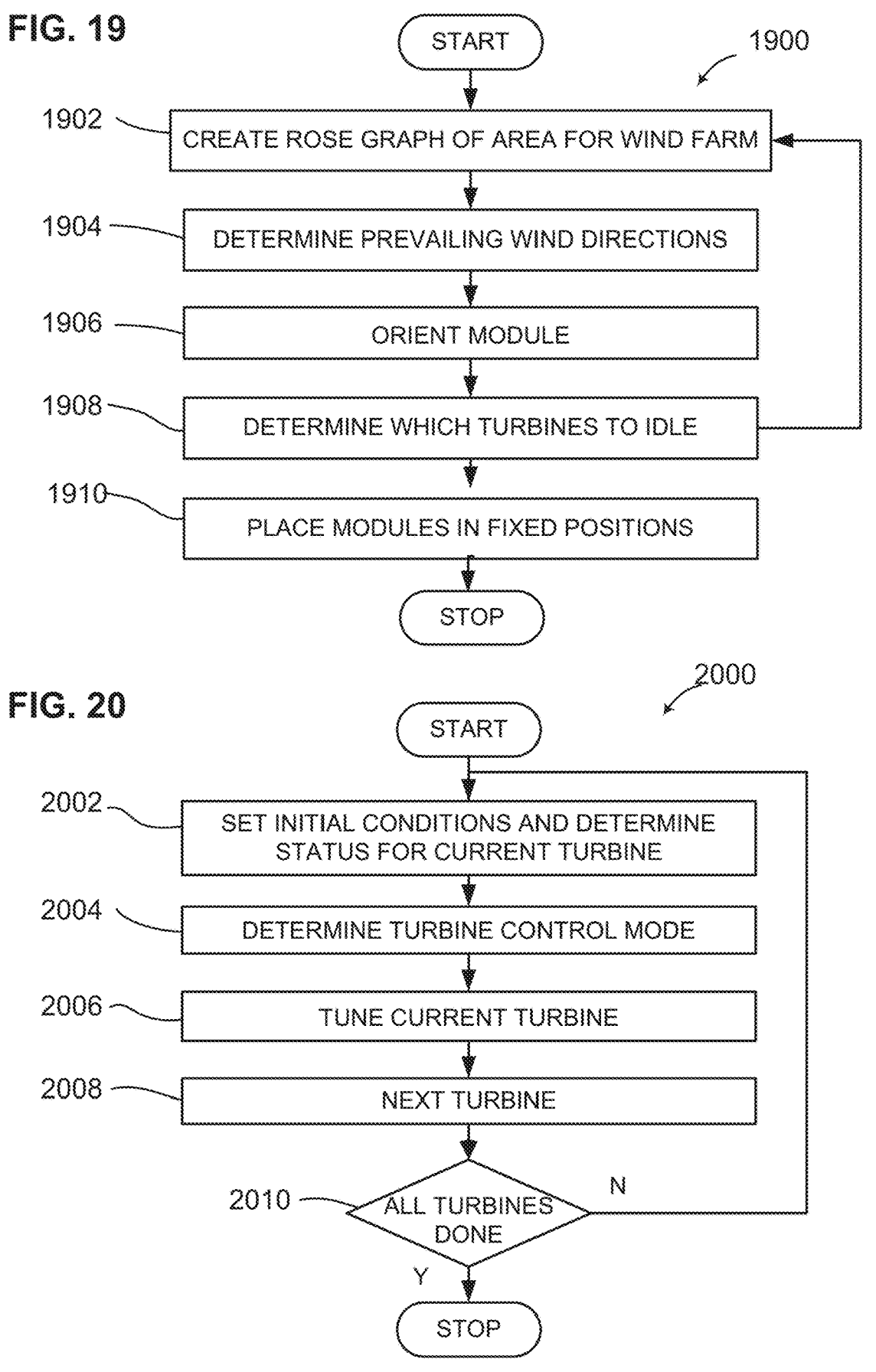

START

1900

1902 — CREATE ROSE GRAPH OF AREA FOR WIND FARM

1904 — DETERMINE PREVAILING WIND DIRECTIONS

1906 — ORIENT MODULE

1908 — DETERMINE WHICH TURBINES TO IDLE

1910 — PLACE MODULES IN FIXED POSITIONS

STOP

START

2002 — SET INITIAL CONDITIONS AND DETERMINE STATUS FOR CURRENT TURBINE

2004 — DETERMINE TURBINE CONTROL MODE

2006 — TUNE CURRENT TURBINE

2008 — NEXT TURBINE

2010 — ALL TURBINES DONE

N

Y

STOP

** UPWIND or DOWNWIND IDLE

FIG. 24

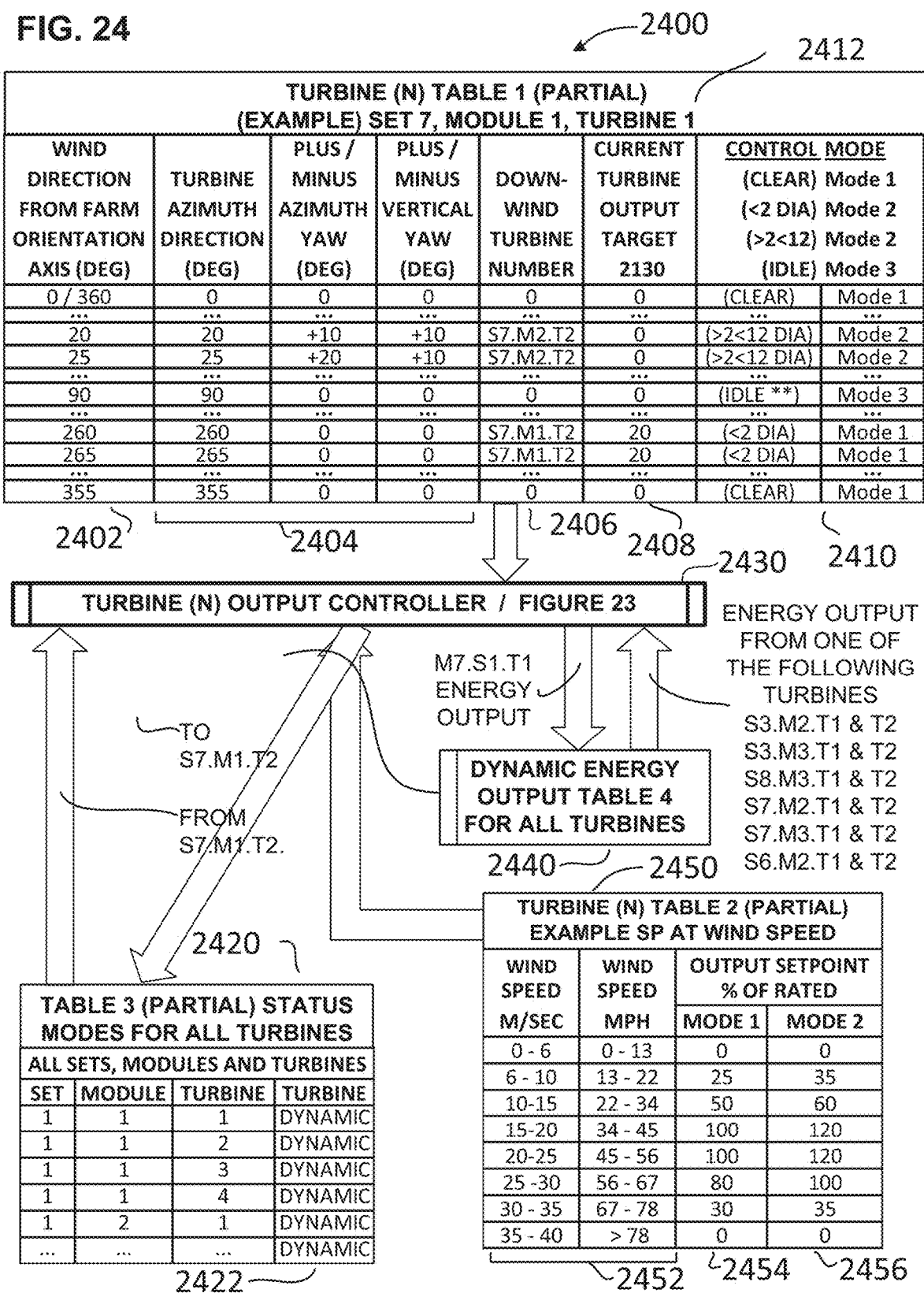

2400

2412

TURBINE (N) TABLE 1 (PARTIAL)
(EXAMPLE) SET 7, MODULE 1, TURBINE 1

| WIND DIRECTION FROM FARM ORIENTATION AXIS (DEG) | TURBINE AZIMUTH DIRECTION (DEG) | PLUS / MINUS AZIMUTH YAW (DEG) | PLUS / MINUS VERTICAL YAW (DEG) | DOWN-WIND TURBINE NUMBER | CURRENT TURBINE OUTPUT TARGET 2130 | CONTROL MODE (CLEAR) Mode 1 (<2 DIA) Mode 2 (>2<12) Mode 2 (IDLE) Mode 3 | |
|---|---|---|---|---|---|---|---|
| 0 / 360 | 0 | 0 | 0 | 0 | 0 | (CLEAR) | Mode 1 |
| ... | ... | ... | ... | ... | ... | ... | ... |
| 20 | 20 | +10 | +10 | S7.M2.T2 | 0 | (>2<12 DIA) | Mode 2 |
| 25 | 25 | +20 | +10 | S7.M2.T2 | 0 | (>2<12 DIA) | Mode 2 |
| ... | ... | ... | ... | ... | ... | ... | ... |
| 90 | 90 | 0 | 0 | 0 | 0 | (IDLE **) | Mode 3 |
| ... | ... | ... | ... | ... | ... | ... | ... |
| 260 | 260 | 0 | 0 | S7.M1.T2 | 20 | (<2 DIA) | Mode 1 |
| 265 | 265 | 0 | 0 | S7.M1.T2 | 20 | (<2 DIA) | Mode 1 |
| ... | ... | ... | ... | ... | ... | ... | ... |
| 355 | 355 | 0 | 0 | 0 | 0 | (CLEAR) | Mode 1 |

2402    2404    2406    2408   2430   2410

TURBINE (N) OUTPUT CONTROLLER / FIGURE 23

TO S7.M1.T2

FROM S7.M1.T2.

M7.S1.T1 ENERGY OUTPUT

ENERGY OUTPUT FROM ONE OF THE FOLLOWING TURBINES
S3.M2.T1 & T2
S3.M3.T1 & T2
S8.M3.T1 & T2
S7.M2.T1 & T2
S7.M3.T1 & T2
S6.M2.T1 & T2

DYNAMIC ENERGY OUTPUT TABLE 4 FOR ALL TURBINES

2440   2450

2420

TABLE 3 (PARTIAL) STATUS MODES FOR ALL TURBINES

ALL SETS, MODULES AND TURBINES

| SET | MODULE | TURBINE | TURBINE |
|---|---|---|---|
| 1 | 1 | 1 | DYNAMIC |
| 1 | 1 | 2 | DYNAMIC |
| 1 | 1 | 3 | DYNAMIC |
| 1 | 1 | 4 | DYNAMIC |
| 1 | 2 | 1 | DYNAMIC |
| ... | ... | ... | DYNAMIC |

2422

TURBINE (N) TABLE 2 (PARTIAL)
EXAMPLE SP AT WIND SPEED

| WIND SPEED M/SEC | WIND SPEED MPH | OUTPUT SETPOINT % OF RATED | |
|---|---|---|---|
| | | MODE 1 | MODE 2 |
| 0 - 6 | 0 - 13 | 0 | 0 |
| 6 - 10 | 13 - 22 | 25 | 35 |
| 10-15 | 22 - 34 | 50 | 60 |
| 15-20 | 34 - 45 | 100 | 120 |
| 20-25 | 45 - 56 | 100 | 120 |
| 25 -30 | 56 - 67 | 80 | 100 |
| 30 - 35 | 67 - 78 | 30 | 35 |
| 35 - 40 | > 78 | 0 | 0 |

2452   2454   2456

** UPWIND or DOWNWIND IDLE

FIG 26

WIND TURBINE FARM

BACKGROUND

The amount of energy that can be extracted from the wind is directly proportional to the surface area of the rotor. To increase the amount of energy, wind turbine blades have become longer. But wind turbines have become so large, they are reaching the limit of what is practical. Utilizing multiple smaller turbines of the same total wind-swept surface area with an innovative arrangement is one effective alternative to increase the output of a wind farm.

Another effective alternative to increase the energy output is to install the wind turbines in the new arrangement of this invention that utilizes much smaller distances between some turbines than would ever be considered in prior art theory wind farms which then makes possible much larger distances between the remaining turbines. The longer distances between some turbines compensates for the loss of energy from the very close turbines.

A number of wind turbines installed within a designated area creates a wind farm. A wind turbine's rotor blades extract some of the energy from the wind, reducing the remaining energy in the wind behind the turbine, and thereby reducing its speed. The wind exiting a turbine also becomes much more turbulent. This wind is called the wake; it is approximately a column of slower velocity, turbulent air that extends many turbine diameters downwind of a turbine.

The turbulent air in the wake causes fatigue damage to any closely spaced downwind turbines, turbulence that cannot be eliminated. Furthermore, the reduced wind speed in the wake contains less energy for downwind turbines. It takes approximately ten to twenty diameters for the wind speed from upwind turbines in a farm to recover much of its lost wind speed, through mixing with the higher speed wind outside of the approximately columnar wake. It may take fifty or more diameter for the wind speed in the wake to completely recover to the velocity entering a turbine.

The wake behind a wind turbine has an approximately cylindrical cross section the diameter of the wind turbine blades. The physical properties of the wind entering a wind turbine, speed, density, turbulence, and sheer, for example, affect the wake's physical properties behind the turbine. Interaction of the rotating blades to extract energy from the wind also affects the physical properties of the wake. Nonetheless, considering the wake cross as approximately cylindrical does not diminish the conclusions and benefits of this invention.

To reduce the lost energy and fatigue damage from turbulence, prior art wind farms separate the turbines multiple diameters apart, approximately 8 to 12 diameters in the prevailing wind direction, and approximately greater than 4 diameters in the crosswind direction. These prior art separation distances are a compromise between infrastructure cost and wind speed recovery in the wake.

FIG. 1 is an illustrative representation of a prior art wind farm 100. Prior art separations of greater than 4 diameters 102 approximately perpendicular to the prevailing wind direction are illustrated as well as the normal average separation of 8 diameters or greater 104 in the prevailing wind direction. Prior art wild farm 100, is laid out as a full matrix, but other non-uniform, sparsely populate matrices are also prior art arrangements (see FIGS. 1, 110, 120 and 130).

FIG. 1 is illustrative of three prior art wind farm layouts 110, 120, and 130. All layouts have the same shapes, boundary dimensions and same areas. Each layout includes different spacing of turbines 112, 122, and 132. As illustrated, prior art wind farm 110 has significant wake interference. As illustrated, turbines 112 are positioned in a 10×10 grid layout for a selected area resulting in 100 turbines with significant wake interference between turbines. Further illustrated is prior art wind farm 120 having reduced wake interference. As illustrated, turbines 122 are positioned over a similar area as illustrated in 110 resulting in only 39 turbines, but with reduced wake interference and reduced total farm output than 110. The use case illustrated may be found at: Feng, Ju; Shen, Wen Zhong, "Optimization of Wind Farm Layout: A Refinement Method by Random Search", Proceedings of the 2313 International Conference on aerodynamics of Offshore Wind Energy Systems and Wakes (ICOWES2013). Still further illustrated is prior art wind farm 130 having further reduced wake interference. As illustrated, turbines 132 are positioned over a similar area as illustrated in 110 resulting in only 40 turbines with reduced wake interference, one turbine more than farm 120, still with lower output than 110. The use case illustrated may be found at: Feng, Ju; Shen, Wen Zhong, "Optimization of Wind Farm Layout: A Refinement Method by Random Search", Proceedings of the 2313 International Conference on aerodynamics of Offshore Wind Energy Systems and Wakes (ICOWES2013).

As such wind turbine farms are presented herein.

SUMMARY

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented below.

As such, wind turbine farms are presented including: a number of steerable wind turbines, where each of the steerable wind turbines includes a turbine diameter and a blade center locus, where each of the steerable wind turbines are separately and axially steerable about a vertical axis to align with one or more prevailing wind directions, where the steerable wind turbines is arranged in one or more modules, where each of the modules is defined by at least two steerable wind turbines, where each of the at least two steerable wind turbines in a module is positioned in a fixed position, the fixed position including a horizontal column coordinate, a horizontal row coordinate, and a vertical elevation coordinate such that the blade center loci between at least two of the at least two steerable wind turbines within the module are separated by approximately 0.5 to 4.0 turbine diameters in any horizontal or vertical direction and where each of the one or more modules includes an optimum orientation corresponding with the one or more prevailing wind directions that minimizes wake interference between other modules in the wind turbine farm. In some embodiments, the optimum orientation corresponding with the one or more prevailing wind directions further includes a range of approximately −25 to +25 degrees. In some embodiments, each module is placed in a fixed module placement and oriented in one or more fixed module orientations. In some embodiments, each module is defined by a grid having at least one row grid line having at least one steerable wind turbine, where for each at least one row grid line, every steerable wind turbine is positioned at a substantially similar vertical elevation. In some embodiments, for each at least one row grid line, at least one steerable wind turbine is positioned directly along a corresponding row grid line. In some embodiments, for each at least one row grid line, at least one additional steerable wind turbine is positioned at an offset distance of the corresponding row grid line. In some embodiments, each module is defined by a grid having at least one column grid line corresponding with at least one steerable wind turbine, where for at least one column grid line, every steerable wind turbine is positioned at a substantially different vertical elevation. In some embodiments, for each at least one column grid line, at least one steerable wind turbine is positioned directly along a corresponding column grid line. In some embodiments, for each at least one column grid line, at least one additional steerable wind turbine is positioned at an offset distance of the corresponding column grid line. In some embodiments, each of the number of steerable wind turbines is vertically steerable. In some embodiments, each of the number of steerable wind turbines is horizontally steerable.

In other embodiments, methods for configuring a wind turbine farm defined by an area are presented including: creating a rose graph of the area, the rose graph graphically illustrating a number of wind characteristics of the area; analyzing the rose graph to determine a one or more prevailing wind directions; placing a number of modules in a number of fixed module positions, where each of the number of modules includes: a number of steerable wind turbines, where each of the steerable wind turbines includes a turbine diameter and a blade center locus, where each of the steerable wind turbines are separately and axially steerable about a vertical axis to align with the one or more prevailing wind directions, where the steerable wind turbines is arranged in one or more modules, where each of the modules is defined by at least two steerable wind turbines, where each of the at least two steerable wind turbines in a module is positioned in a fixed position, the fixed position including a horizontal column coordinate, a horizontal row coordinate, and a vertical elevation coordinate such that the blade center loci between at least two of the at least two steerable wind turbines within the module are separated by approximately 0.5 to 4.0 turbine diameters in any horizontal or vertical direction. In some embodiments, the analyzing the rose graph includes: determining a first prevailing wind direction based on a first highest wind direction and speed probability distribution. In some embodiments, the analyzing the rose graph further includes: determining a second prevailing wind direction based on a second highest wind direction and speed probability distribution, where the second highest wind direction and speed probability distribution is equal to or lower than the first highest wind direction and speed probability distribution. In some embodiments, the analyzing the rose graph further includes: determining a third prevailing wind direction based on a third highest wind direction and speed probability distribution, where the third highest wind direction and speed probability distribution is equal to or lower than the second highest wind direction and speed probability distribution. In some embodiments, methods further include: determining at least one additional prevailing wind direction based on at least one additional highest wind direction and speed probability distribution, where the at least one highest wind direction and speed probability distribution is equal to or lower than the third highest wind direction and speed probability distribution. In some embodiments, number of wind characteristics is selected from the group consisting of: a wind direction, a wind speed, and a wind duration.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the inventive subject matter.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is illustrative representation of wind farms in accordance with embodiments of the present invention;

FIG. 8 is an illustrative representation of two wind rose diagrams in accordance with embodiments of the present invention;

FIG. 14 is an illustrative representative of a wind farm layout in accordance with embodiments of the present invention;

FIG. 15 is an illustrative representative of a wind farm layout in accordance with embodiments of the present invention;

FIG. 16 is an illustrative representative of a wind farm layout in accordance with embodiments of the present invention;

FIG. 19 is an illustrative flow chart of methods for configuring a wind farm in accordance with embodiments of the present invention;

FIG. 20 is an illustrative flow chart of methods for controlling a wind farm in accordance with embodiments of the present invention;

FIG. 24 is an illustrative representation of tables and control diagrams utilized for methods of controlling a wind farm in accordance with embodiments of the present invention;

FIG. 26 is an illustrative representative of a wind farm layout in accordance with embodiments of the present invention;

DETAILED DESCRIPTION

Figure 1:
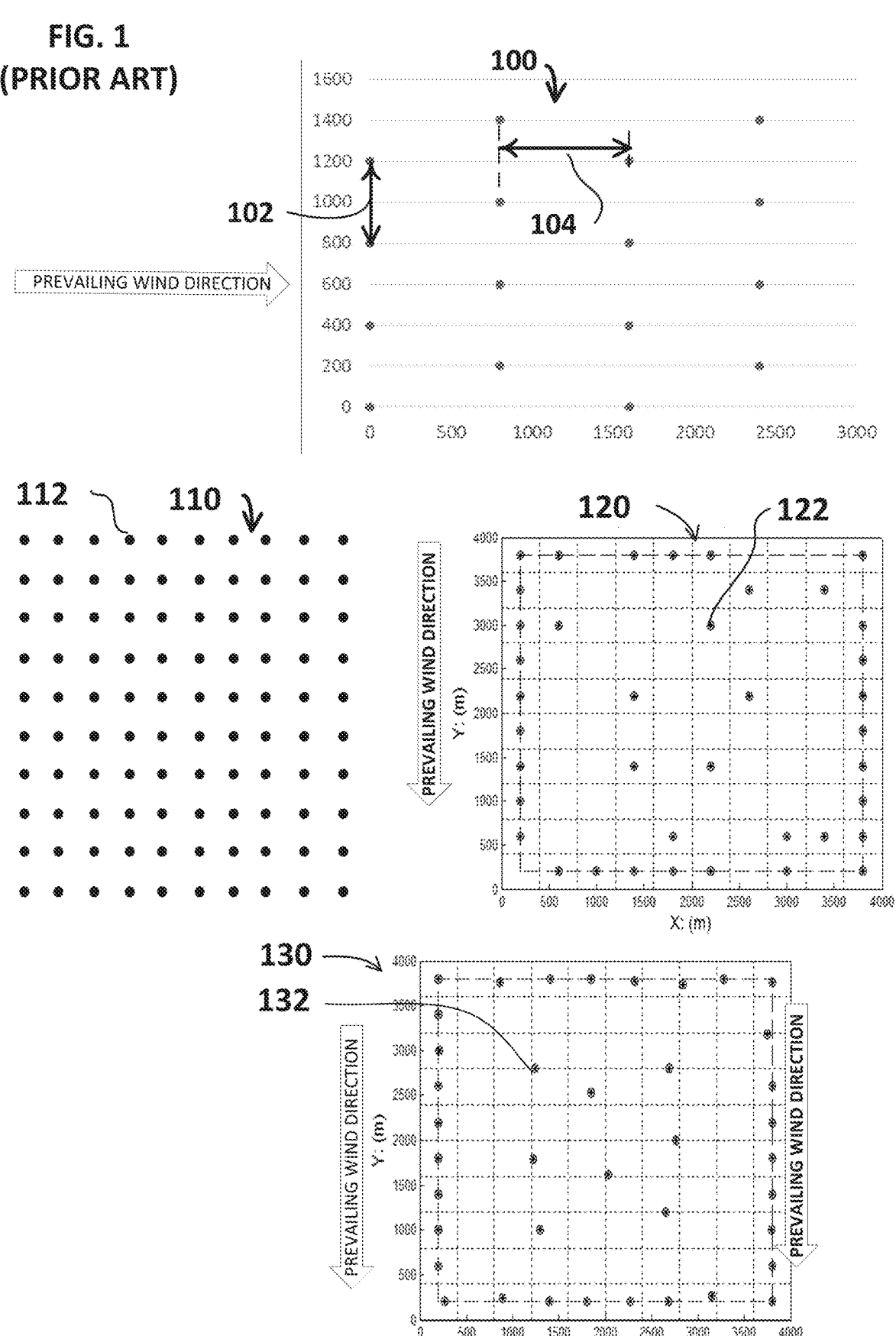
FIG. 1 is a prior art illustrative representation of a wind farm.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

In still other instances, specific numeric references such as "first material," may be made. However, the specific numeric reference should not be interpreted as a literal sequential order but rather interpreted that the "first material" is different than a "second material." Thus, the specific details set forth are merely exemplary. The specific details may be varied from and still be contemplated to be within the spirit and scope of the present disclosure. The term "coupled" is defined as meaning connected either directly to the component or indirectly to the component through another component. Further, as used herein, the terms "about," "approximately," or "substantially" for any numerical values or ranges indicate a suitable dimensional tolerance that allows the part or collection of components to function for its intended purpose as described herein.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Terminology

Steerable Wind Turbine: As utilized here, the term steerable wind turbine refers to a single-rotor wind turbine or a wind turbine array that rotates to face the wind about a single vertical azimuthal axis. Steerable wind turbine also includes steerable wind turbine arrays with multiple rotors or turbines, all facing the wind about a single vertical azimuthal axis.

Fixed Position: As utilized herein, fixed position refers to a latitude and longitude position that is constant or defined as the geometric center of a constrained area that limits the allowable changes in the latitude and longitude.

Matrix: As utilized herein, the term matrix refers to the number of wind turbines and their configuration. For example, a 2×2 matrix of turbines includes two turbines along the width or row and two turbines along the depth or column of a module, each of the four turbines at one or more elevations. For example, a 1×2 matrix of turbines includes one turbine along the width or row and two turbines along the depth or column of a module, each turbine at one or more elevations. For example, a 2×1 matrix of turbines includes two turbines along the width or row and one turbine along the depth or column of a module, each turbine at one or more elevations. Any number of matrix configurations may be utilized without limitation in embodiments provided herein.

Module: As utilized herein, the term module refers a group of at least two steerable wind turbines each turning about their own vertical azimuthal axes to face toward or away from the wind installed in one or more structures, where the blade center loci are separated by 0.5 to 4 diameters. When there are more than two turbines in a module, the third and higher turbines can have greater blade center loci separation than 4 diameters from other turbines in the module. Groupings of turbines into modules are utilized to improve efficiency and to optimize placement and orientation.

Pair: As utilized herein, the terms pair, turbine pair, or pairs refers to a module with the minimum number of two steerable turbines or two steerable turbine arrays required to create a module. For simplicity turbine pairs are often illustrated herein as example embodiment of modules; but the principles of this invention apply equally well to modules with more than two steerable turbines or more than two steerable turbine arrays. The separation distances between steerable wind turbines or steerable wind turbine arrays creating a module with a pair or more than two steerable wind turbines are specified herein.

Azimuthal: As utilized herein, the term azimuthal refers to horizontal steering of steerable wind turbines. Horizontal steering is utilized to orient the wind turbine in the compass direction to optimum energy capture from the wind and to orient the wind turbine to reduce wind interference to adjacent and downwind turbines.

Altitudinal: As utilized herein, the term altitudinal refers to vertical steering of steerable wind turbines. Vertical steering or veer is utilized to reduce wind interference to adjacent and downwind turbines.

Optimum wind angle: As utilized herein, the term optimum wind angle refers to the module orientation that is best suited to receive a prevailing wind. The optimum wind angle is perpendicular to the module and is aligned with the prevailing wind to which a module is oriented, plus or minus 15 degrees in most cases, but up to plus or minus 25 degrees, if necessary, to improve total efficiency of the wind farm.

Turbine useable wind range: As utilized herein, the term turbine useable wind range is the range between the two largest wind angles for which the wakes of the upwind turbine do not enter the rotors of adjacent downwind turbines in a module.

Prevailing Wind Directions: As utilized here in, prevailing wind directions are based on highest wind direction and speed probability distributions. There may be one or more prevailing wind directions. By symmetry, wind angles approximately 180 degrees from a prevailing wind direction have similar performance to the prevailing wind direction and do not define a separate prevailing wind direction, regardless of the wind speed probability distribution at approximately 180 degrees from the prevailing wind direction.

Wake Centerline: as utilized herein the wind downwind of a wind turbine rotor forms a wake of lower speed and higher turbulence air, approximately a cylindrical column of air with a diameter approximately the same as the circle circumscribed by the rotation of the blades. This cylinder of turbulent air continues downwind of the turbine for many diameters. The axis of this cylinder of air defines the wake centerline. This axis also intersects the plane of blade rotation at the center of the rotor diameter.

Blade Center Locus: as utilized herein blade center locus refers to a point where the wake center line intersects with the plane formed by the rotation of the turbine blades to extract energy from the wind. This is also the point where the blade rotational axis intersects the plane of blade rotation. It may also be defined as the center of the swept area or the intersection of the wake centerline and the plane of blade rotation.

Hub Height: as utilized herein an alternate term for the elevation of a steerable wind turbine blade rotation axis, that is the elevation of the axis around which the blades rotate around the blade center locus in the plane of rotation, extracting energy from the wind.

Module Wind Farm: as utilized herein is a grouping of wind turbines created with one or more modules embodied by this invention to extract energy from the wind.

Embodiments provided herein also apply multiple smaller wind turbine rotors to replace a single large wind turbine rotor. Steerable wind turbine embodiments are configured to rotate about their individual vertical and horizontal axes so the planes of the rotors remain approximately parallel, but not always on the same plane. Unfortunately, this configuration creates wake interference to some wind turbine rotors closely and directly downwind of other wind turbine rotors for some wind directions. To overcome the wake interference, one embodiment utilizes two turbines side by side and two turbines high in a module in a 2×2 matrix or a 2×1 matrix or a 1×2 matrix. This configuration limits the number of closely spaced turbines in the same module that can be directly in line causing wake interference although more than two turbine rotors side by side and higher than two turbines may be desirable in some embodiments.

In addition, in embodiments, three different modules may be useful when there are multiple prevailing wind directions. Three-modules also allow 12 turbines to replace a single large conventional wind turbine. This configuration also allows the modules to be physically located to minimize wake interference from the other modules in a set. Twelve rotors allow the multiple turbines to be only 29% of the diameter of the single large rotor the set replaces. Furthermore, the modules are placed with respect to each other and to the prevailing wind directions at a wind farm location such that only one module at a time has its own wind turbine rotors directly inline, creating wake interference.

Still further, when two turbines in the same module are oriented into the wind such that one is directly behind the other, control embodiments may adjust the blade pitch to significantly reduce the energy production from the downwind or upwind turbine in a module, thereby reducing the turbulence stress on the downwind turbine and allowing the upwind or downwind turbine to produce at near capacity. Fatigue damage is thereby reduced, but at the cost of less energy output from that group of turbines. This reduces the number of rotors not producing full power to two in a 2×2 matrix or to one in a horizontal 1×2 matrix turbine-pair. Still further, many modules are installed to create a wind farm in embodiments. Other control methods may also be applied without limitation to maximize energy output or to reduce stress on the turbines.

Embodiments provided present different combinations and configurations including at least:

Two turbines arranged side-by-side, arranged one above the other, or more than two side-by-side or more than two high;

One turbine high, two turbines or three turbines high, four turbines high, or more than four turbines high installed as a module;

Monopole structure or non-monopole structure;

Pitch control (preferred), or no pitch control;

Vertical rotor plane adjustment (altitudinal) for wake steering, or no vertical rotor plane adjustment.

The modules created by the wind farm design of this invention apply extremely small separation distances between some turbines that would never ever be considered in conventional windfarms because of the extensive fatigue damage to the very close downwind turbines from the wake of upwind turbines.

This disclosed design mitigates the serious problems of significantly closer distances between some turbines, approximately 0.5 to 4 diameters apart in this design. This unthinkable much tighter spacing of 0.5 to 4 diameters would never be considered in conventional wind farms because the excessive wake turbulence would damage any downwind turbines this closely spaced, plus it would also significantly reduce the downwind turbines' energy output to near zero.

The fatigue damage and lost energy from these very closely spaced turbines are also mitigated by arranging the turbines so the damaging wakes occur at the low-speed, low frequency wind directions, where fatigue damage is less, and the loss of energy is a smaller percentage of the total farm output. Furthermore, the reduced energy from unacceptably close distance between some turbines, unthinkable in prior wind farms, can be further mitigated by arranging groups (modules) of closely spaced turbines with much larger distances between the groups (modules) to offset all or some of the energy loss from the very closely spaced wind turbines within modules. The larger distances between some turbine modules allow more energy from the wind outside of the wake to intermix with the wake, reducing its turbulence and increasing its speed and energy.

The aerodynamics of why the spacing of disclosed embodiments are explained herein. Embodiments provided align the damaging turbulence to the slower, less frequent wind directions in its module design, thereby lowering the lost energy's percentage of the total farm energy. Fatigue damage cannot be completely eliminated but is reduced to an acceptable level by the control system, which reduces the wake turbulence, thereby accepting the energy loss, but mitigating fatigue damage. The controls accomplish this by operating one or more of the turbines to extract significantly less or no wind energy from closely spaced turbines, thereby accepting most of the unavoidable loss in farm energy output, but with the benefit of reducing the damaging turbulence.

Embodiments provided significantly reduce the energy extracted from the wind by closely spaced turbines, down to zero for some turbines, thereby limiting the damaging turbulence, but at a serious loss of energy output from the farm for some closely spaced turbines. This tradeoff would not be considered by conventional wind farms, only greater separation distances are adjusted against farm infrastructure costs to maximize energy costs and output.

In embodiments, the module design aligns the damaging wakes to the lower speed directions. While the closest turbines in modules are very closely spaced, between approximately 0.5 and 4 diameters, modules within a wind farm can be spaced much farther apart than in conventional wind farms, greater than 8 to 12 diameters for example, within the same wind farm plot area, and in the higher speed, higher frequency wind directions. This provides more distance for the wind outside of the wake boundaries to reduce the turbulence and increase the speed of the wind for the farther spaced downwind modules of turbines in the higher speed more frequent wind directions.

Wake damage and energy loss can also be mitigated by applying a plurality of smaller wind turbines in a module to replace a much larger wind turbine of the same total swept area. Wake recovery distance is a function of turbine diameter, so smaller diameter wind turbines' wakes recover in about the same number of diameters as larger turbines, but the wake recovery distance is shorter in absolute distance, allowing closer spacing of turbines in a wind farm for the same number of diameters, reducing energy loss and wake turbulence to the smaller turbines, all within the same wind farm plot area as the larger wind turbines.

Wake Interference

FIG. 2 is illustrative representation of wind farms in accordance with embodiments of the present invention. In particular, FIG. 2 illustrates module wind farm 210 applying an unacceptably close spacing 214 within module 212 and possibly greater spacing 216 between some modules 212 and much greater spacing 220 between some modules 212. The differences between separation distances in primary wind directions in conventional wind farms as illustrated in FIG. 1, 104 and much greater distances 220 as illustrated in embodiment shown here. Not illustrated in FIG. 2, some modules 212 may have a different azimuthal alignment. In FIG. 1 both conventional wind farms 120 and 130, the reduction of wake interference is achieved by limiting the number of turbines in the farm and the strategic placement of the turbines. This strategic placement results in an increase of one turbine from conventional windfarm 130 to conventional windfarm 120. However, the density of turbines in both conventional windfarm configurations 120 and 130 is much lower than the density of turbines in the more typical conventional embodiment provided in 110, creating less wake interference loss, but the fewer turbines produce less farm total energy output.

Figures 3, 4:
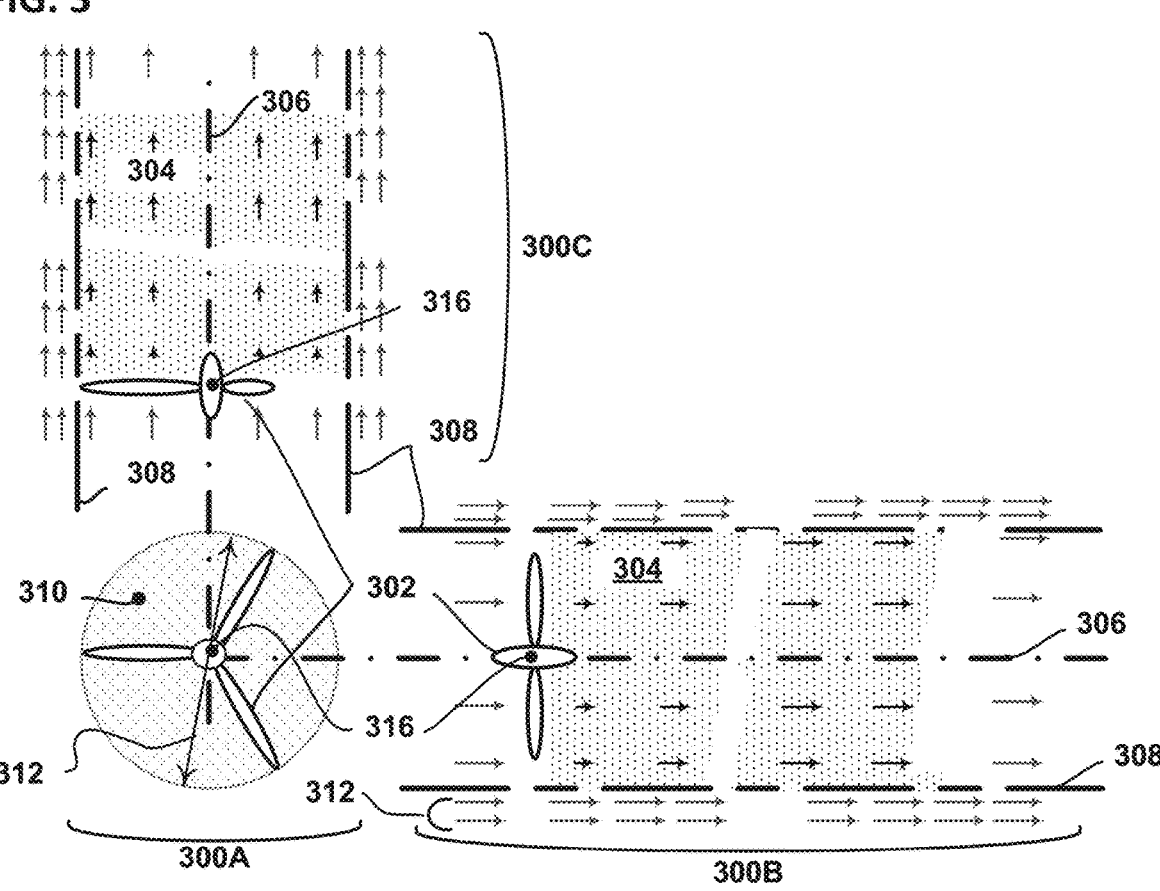
FIG. 3 is an illustrative representation of wake characteristics of a downwind turbine in accordance with embodiments of the present invention.
FIG. 4 is an illustrative isometric representation of wake characteristics of a downwind turbine in accordance with embodiments of the present invention.

FIG. 3 is an illustrative representation of wake characteristics of a downwind turbine in accordance with embodiments of the present invention. In particular, FIG. 3 includes front view 300A, side view 300B, and top view 300C of a wake produced by wind turbine blades 302. As may be appreciated, a wake is generated when a wind turbine is in operation. The wake is defined by a disruption in the environmental airflow due to the rotation of the wind turbine's blades extracting energy from the wind. As utilized herein, wake 304 includes wake centerline 306 which is colinear with the wind turbine blade rotational axis. Wake 304 further includes wake boundary 308 which defines the edge of the wake of concern and the undisturbed wind 312 just outside the wake boundary 308. Note that the density of the arrows just outside of wake boundary 308 are denser compared to the arrows within wake boundary 308. This illustrates that the wind outside of the wake is faster than the air inside of the wake.

Further illustrated is swept area 310 that defines the area "swept" by the blades of the wind turbine. Further illustrated in the blade center locus 316 defined as the center of the swept area or the intersection of the wake centerline and the plane of blade rotation. Generally, a wake of an upwind turbine entering the swept area of downwind turbines creates wake interference causing fatigue stresses and loss of efficiency of wind turbines downwind of the upwind turbine. Conventional wind farms reduce wake fatigue, wake turbulence, and wake interference by separating wind turbines to an average of 8 diameters at prevailing wind directions and 4 or more diameters at the crosswind direction to reduce power loss and turbulence stress. In large scale conventional wind farms, this means that the power production density of the farm is limited. In embodiments disclosed herein, the average wake interference is minimized by orientating and placing wind turbines in accordance with one or more local prevailing wind directions as well as by steering. This wake interference minimization results in a higher power production density over conventional solutions for the wind roses of many wind resources. In placing wind turbines using embodiments provided herein, the blade center loci of at least two turbines will be separated by approximately 0.5 to 4 diameters from the nearest turbines in a module for at least two turbines. In some embodiments wake centerlines are separated by approximately 0.5 to 4 turbine diameters when the plane of the rotors is perpendicular to the assigned prevailing wind direction. It is not geometrically possible to have all turbines in a module separated by the same 0.5 to 4 diameters; therefore, the definition of a module requires at least two turbines separated by only 0.5 to 4 diameters. The spacing of any remaining turbines can be greater. Separations less than 0.5 diameters are not useful.

FIG. 4 is an illustrative isometric representation of wake characteristics of a downwind turbine in accordance with embodiments of the present invention. In particular, FIG. 4 illustrates an isometric view of wind turbine 400. As utilized herein, wake 404 includes wake centerline 406 which corresponds with the wind turbine blade rotational axis, that is they are colinear. As utilized herein, blades 402 include a blade center locus 416 which corresponds with the intersection of the blade rotational axis, the wake centerline and the plane of blade rotation 424. In placing wind turbines using embodiments provided herein, the blade center loci of two turbines will be separated by approximately 0.5 to 4 diameters from the nearest turbines in a module for at least two turbines. In some embodiments wake centerlines are separated by approximately 0.5 to 4 turbine diameters when the plane of the rotors is perpendicular to the assigned prevailing wind direction. Wake 404 further includes wake boundary 408 which defines the edge of the wake of concern and the undisturbed wind 414 just outside the wake boundary 408. Further illustrated is swept area 410 that defines the area "swept" by the blades of the wind turbine as measured by turbine diameter 418. Further illustrated is azimuthal steering axis 412. As noted above, the azimuthal steering axis corresponds with a vertical axis that provides horizontal rotation of a wind turbine. As such, in embodiments, wind turbines may be horizontally steered about the azimuthal steering axis to minimize wake interference.

Figure 5:
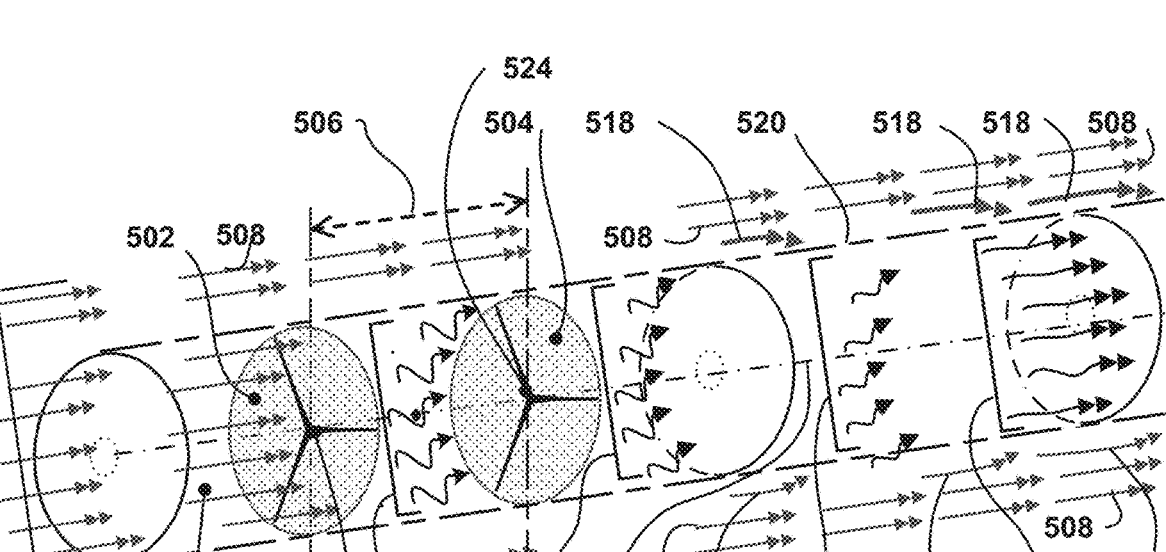
FIG. 5 is an illustrative representation of wake characteristics two closely spaced turbines in accordance with embodiments of the present invention.

FIG. 5 is an illustrative representation 500 of wake characteristics two closely spaced turbines in accordance with embodiments of the present invention. In particular, FIG. 5 illustrates how the wake slows down after two very closely spaced turbines 502 and 504 and becomes more turbulent after passing through a wind turbine but much farther downwind in the wake, wind outside of the wake starts to influence the wake and increase its speed as designated by the longer and less curved arrows 514. As illustrated, the wind speed in the wakes downwind of two turbines separated 0.5 to 4 diameters at a wind direction where the planes of the turbine blades are parallel and at maximum wake interference when the wind direction is approximately crosswind of the prevailing wind direction. The wake boundary 520, wake centerline 516, upwind turbine 502 and downwind turbine 504 are illustrated. The incoming wind speed 508, the fastest in FIG. 5, is illustrated by the length of the straight line with the double arrow. The lower speed and more turbulent wind behind the first turbine 502 is shown with shorter curved arrows with a single arrow 510 to illustrate the reduced wind speed in the wake behind the first turbine. The width of the curves indicates the turbulence in the wind. The slowest wind speed and greatest turbulence 512A is behind the second turbine 504 designated by the shortest curved line with a single arrow 512A to show further reduction of wind speed in the wake. The width of the curves indicates the turbulence in the wind.

The wind outside the wake 508 begins to interact with the wake, starting to cross the wake boundary several diameters downwind of a turbine and is illustrated by 518 with the curved double arrows getting a little longer farther down the wake, this interaction speeds up the wind in the wake and reduces the turbulence. Farther downwind the speed is higher and less turbulent as shown by curved arrows 512B. The speed is about the same, but with less turbulence. Much farther downwind, the wind 508 and 518 outside of the wake has had time to mix with the wake, thereby increasing its speed and reducing the turbulence, as shown by 514. The lines are longer with narrower curves and double arrows to indicate it faster and less turbulent. The spacing between the two turbines 506 of less than 4 diameters is illustrated along with the wake boundary 520 and the wake centerline 516. The incoming wind approximately uniform in the plane parallel to the plane of the first turbine interacts with the plane of the turbine which creates a column of high-speed wind 508, 522 impacting the rotor's plane, causing the blades to rotate.

The interaction of the rotor with the incoming column of high-speed wind reduces the speed of the wind in the wake just behind the first turbine. As the operation of the turbine is adjusted to extract more energy from the wind, it reaches a limit. The wind behind the turbine must have enough energy left to move out of the way of the wind entering the turbine. One this limit is reached, called the Betz Law, the maximum amount of energy that can be extracted from the wind is 59 percent. Mechanical, electrical, and aerodynamic losses reduce the actual electrical power production to about 50 percent of the energy in the wind.

Note that the very close separation distance between the turbines 502 and 504 allows little opportunity for the higher speed wind 508, 518 just outside of the wake boundary 520 to enter the wake to impart more energy into it for the very close downwind turbine. Very little energy can be extracted from the lower speed wind 510 after the first turbine without impeding the wind entering the upwind turbine. This means there is no more energy to be extracted by a downwind turbine until many diameters downwind where the higher speed wind outside of the wake can mix and increase the available wind energy.

The consequences of the physical laws and aerodynamics, two closely spaced turbines when their wakes fully overlap extract approximately the same energy as one turbine. Thus, the turbine costs will be two times greater for the energy output of one turbine in some wind directions. A practitioner skilled in the art would be well aware of doubling of the costs as well as the fatigue damage to the turbines from turbulence created by the upwind turbine and would never consider such a close positioning of wind turbines. And the lost power in these closely spaced turbines cannot be recovered. Losing half of the power, even at lower wind speed directions would be undesirable.

Grid Orientation

Figures 6A, 6B, 6C:
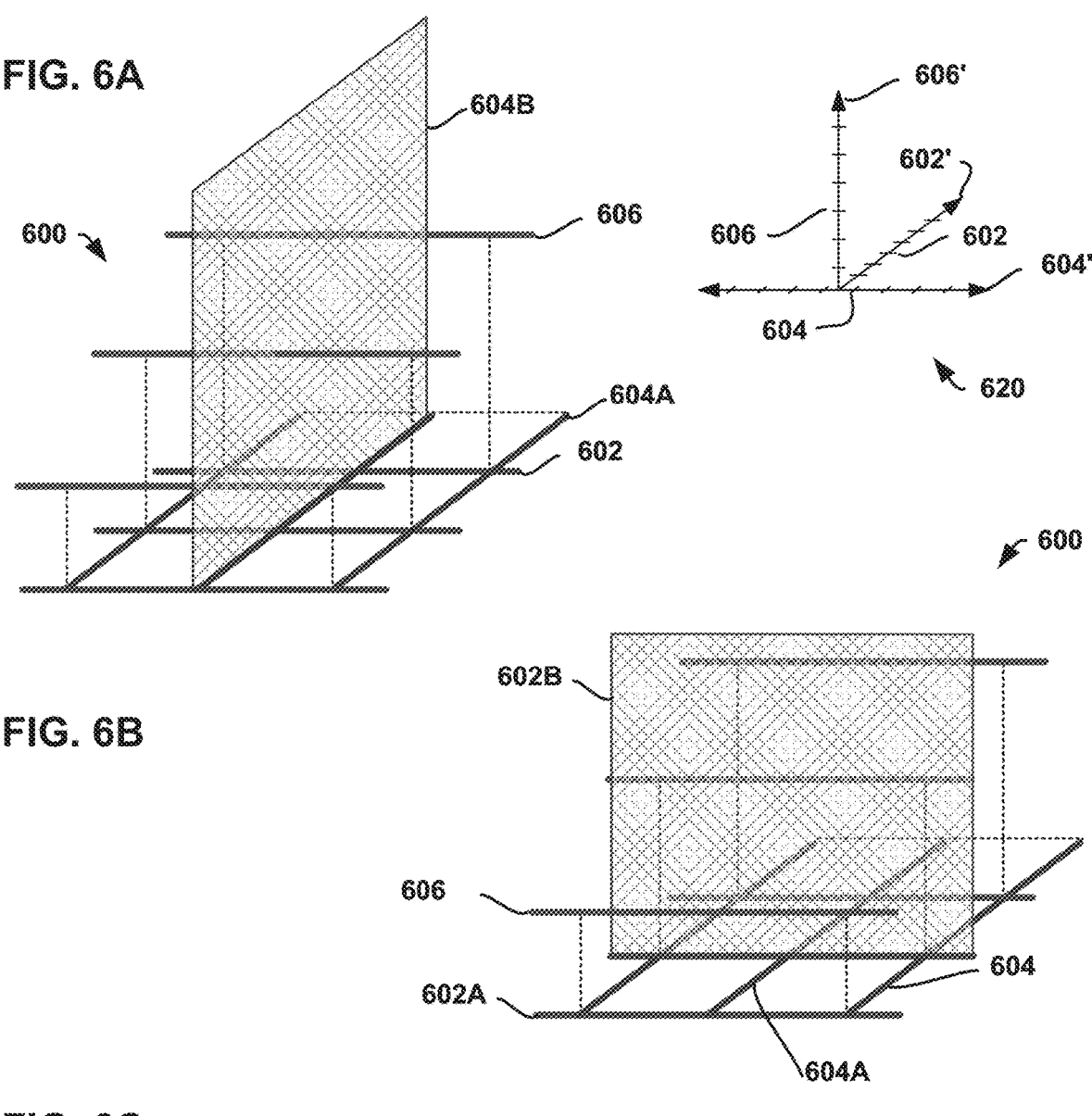
FIGS. 6A-6C are illustrative isometric representations of grid orientation in accordance with embodiments of the present invention.

FIGS. 6A-6C are illustrative isometric representations of grid orientation 600 in accordance with embodiments of the present invention. In particular, FIGS. 6A-6C are provided for clarity in understanding wind turbine positions utilizing embodiments provided herein. The 3-Dimensional graphs illustrated correspond with axes FIG. 620 having row axis 602' corresponding with rows 602, column axis 604' corresponding with columns 604, and elevation axis 606' corresponding with elevations 606. Each row includes a horizontal row coordinate to indicate position. Likewise, each column includes a horizontal coordinate to indicate position and each elevation includes a vertical elevation coordinate to indicate position.

As such, FIG. 6A is an illustrative orthogonal representation of 3×3×3 grid 600. The grid presented represents a single illustrative example and should not be construed as limiting with respect to the number of rows, columns, or elevations. As illustrated grid 600 includes a number of rows 602, a number of columns 604A, and a number of elevations 606. As illustrated, column plane 604B shows position and orientation of a particular column. As such, a wind turbine positioned anywhere along column plane 604B, for example, may be understood to be aligned or unaligned along the column corresponding with its column plane regardless of row or elevation. A wind turbine may be aligned (or positioned directly along) a grid line or unaligned (or positioned an offset distance) from a grid line.

FIG. 6B is an illustrative orthogonal representation of 3×3×3 grid 600. The grid presented represents a single illustrative example and should not be construed as limiting with respect to the number of rows, columns, or elevation. As illustrated grid 600 includes a number of rows 602A, a number of columns 604, and a number of elevations 606. As illustrated, row plane 602B shows position and orientation of a particular row. As such, a wind turbine positioned anywhere along row plane 602B, for example, may be understood to be aligned or unaligned along the row corresponding with its row plane regardless of column or elevation. A wind turbine may be aligned (or positioned directly along) a grid line or unaligned (or positioned an offset distance) from a grid line.

FIG. 6C is an illustrative isometric representation of 3×3×3 grid 600. The grid presented represents a single illustrative example and should not be construed as limiting with respect to the number of rows, columns, or elevation. As illustrated grid 600 includes a number of rows 602, a number of columns 604, and a number of elevations 606A. As illustrated, elevation plane 606B shows position and orientation a particular elevation. As such, a wind turbine positioned anywhere along elevation plane 606B, for example, may be understood to be aligned or unaligned along the elevation corresponding with its elevation plane regardless of row or column. A wind turbine may be aligned (or positioned directly along) a grid line or unaligned (or positioned an offset distance) from a grid line.

Figure 7A:
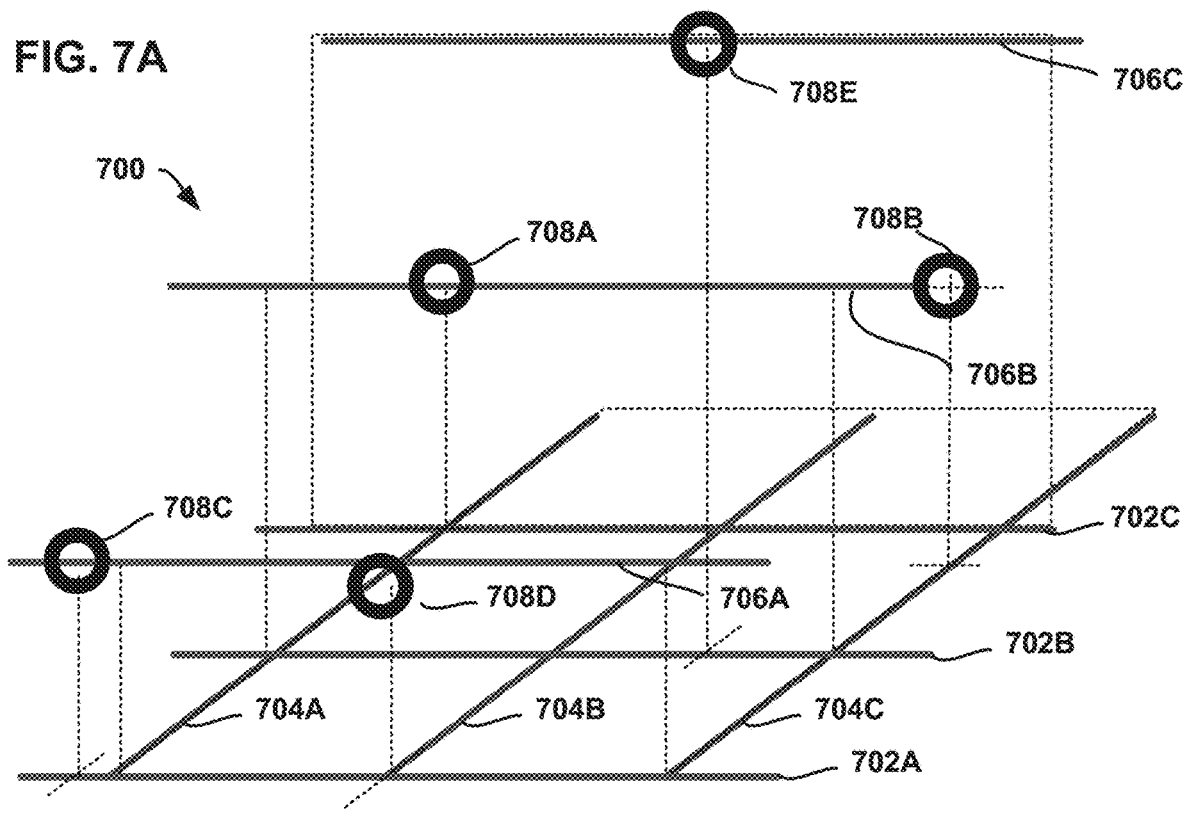
FIGS. 7A-7B are illustrative isometric and top representations of grid orientation in accordance with embodiments of the present invention.
Figure 7B:
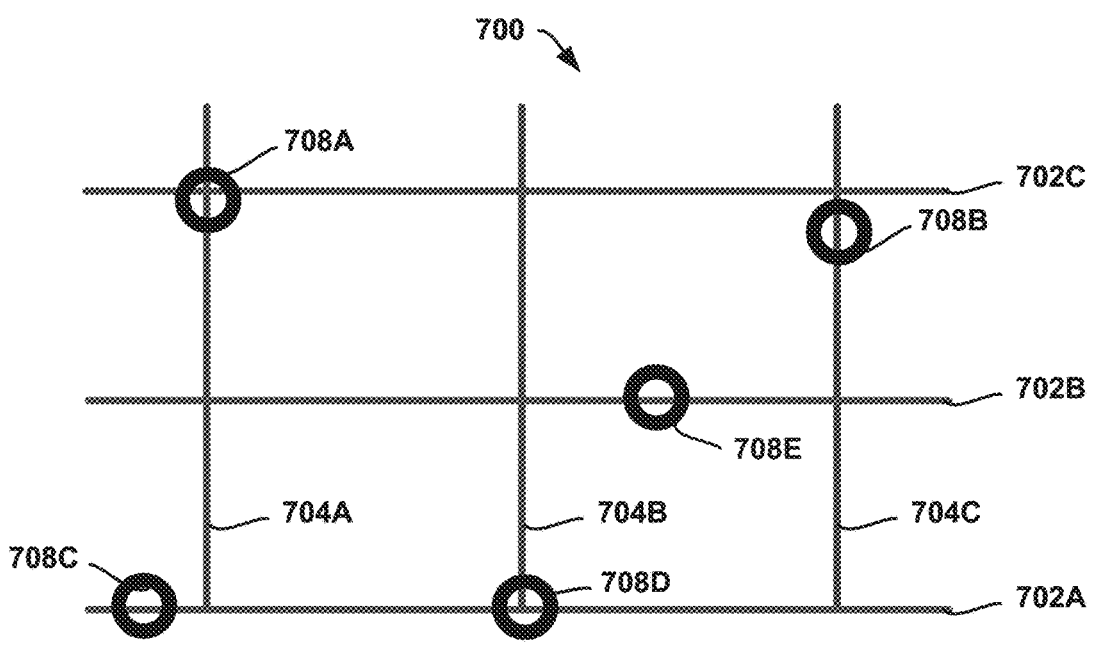

FIGS. 7A-7B are illustrative isometric and top representations of grid orientation in accordance with embodiments of the present invention. In particular, FIG. 7A is an isometric view of a 3×3×3 grid while FIG. 7B is a top view of the same grid. As illustrated grid 700 includes a number of rows 702A-702C, a number of columns 704A-0704C, and a number of elevations 706A-C. Also illustrated are wind turbines 708A-0708E. As may be seen wind turbines 708A and 708B are substantially aligned along elevation 706B, while wind turbines 708C and 708D are unaligned at an offset distance along elevation 706A.

Likewise in FIG. 7B top view, grid 700 includes a number of rows 702A-702C and a number of columns 704A-704C. As may be seen wind turbines 708A and 708B are unaligned at an offset distance along row 702C, while wind turbines 708C and 708D are substantially aligned along row 702A. In addition, wind turbines 708A and 70C are unaligned at an offset distance along column 704A.

Likewise in FIG. 7A and FIG. 7B wind turbine 708E is unaligned at an offset distance with wind turbines 708A-D in rows 702A and 702C, unaligned at an offset distance with wind turbines 708A-D in columns 704A-C, and unaligned at an offset distance with wind turbines 708A-D in elevations 706A-C. Thus, wind turbines may be substantially aligned or unaligned at an offset distance across rows, columns, and elevations without limitation without departing from embodiments provided herein.

Prevailing Wind

FIG. 8 is an illustrative representation of two wind rose diagrams in accordance with embodiments of the present invention. In particular, FIG. 8 illustrates two wind rose diagrams 800 and 850, one with three prevailing wind directions 802, 804, 806 and one with two prevailing wind directions 852, 854 in accordance with embodiments of the present invention. As known in the art, a wind rose is a graphic tool used by meteorologists to give a succinct view of how wind speed and direction are typically distributed at a particular location. Using a polar coordinate system of gridding, the frequency of winds over a time period is plotted by wind direction, with color bands showing wind speed ranges. The direction of the longest spoke shows the wind direction with the greatest magnitude and frequency. As illustrated and based on the wind rose 800, three prevailing wind directions 802, 804, 806, are illustrated. As illustrated and based on wind rose 850, two prevailing wind directions 852, 854 are illustrated. In some embodiments, one of the prevailing wind directions is the primary prevailing wind direction or the wind direction having the highest wind potential. The wind rose illustrated is presented for clarity in presenting and understanding embodiments disclosed herein. The data represented by the wind rose in this illustration does not represent actual data and is provided to illustrated how wind farm embodiments are configured and operated.

As utilized herein, a turbine diameter is the diameter FIG. 3, 312, FIG. 4, 418 of a circle defined by the steerable wind turbine blade rotation around its approximately horizontal axis. In embodiments, each module has a fixed orientation corresponding with a prevailing wind direction and the module orientation axis as determined by a rose graph. As noted above, rose graph 800 includes three prevailing wind directions 802, 804, and 806 while rose graph 850 includes only two prevailing wind directions. In embodiments, each module orientation is adjusted to approximately 90 degrees plus or minus 15 degrees from its corresponding prevailing wind directions positioned within the plus or minus 15 degrees such that the remaining prevailing wind directions, if any, fall within the turbine useable wind range as much as possible In this manner, each module in a set is oriented to one corresponding prevailing wind direction with the best compromise for any remaining prevailing wind directions. In embodiments, turbine modules are oriented to within 15 degrees of the optimum wind angle. In some embodiments, turbine modules are oriented to within 25 degrees of the optimum wind direction. In embodiments, some wake centerlines within a module are separated by 0.5 to 4 turbine diameters, but at least two turbines in a module must have their blade center loci separated from 0.5 to 4 diameters. There is no other restriction on the placement of turbines beyond additional turbines after the two turbines positioned 0.5 to 4 diameters apart.

Matrices

Figure 9:
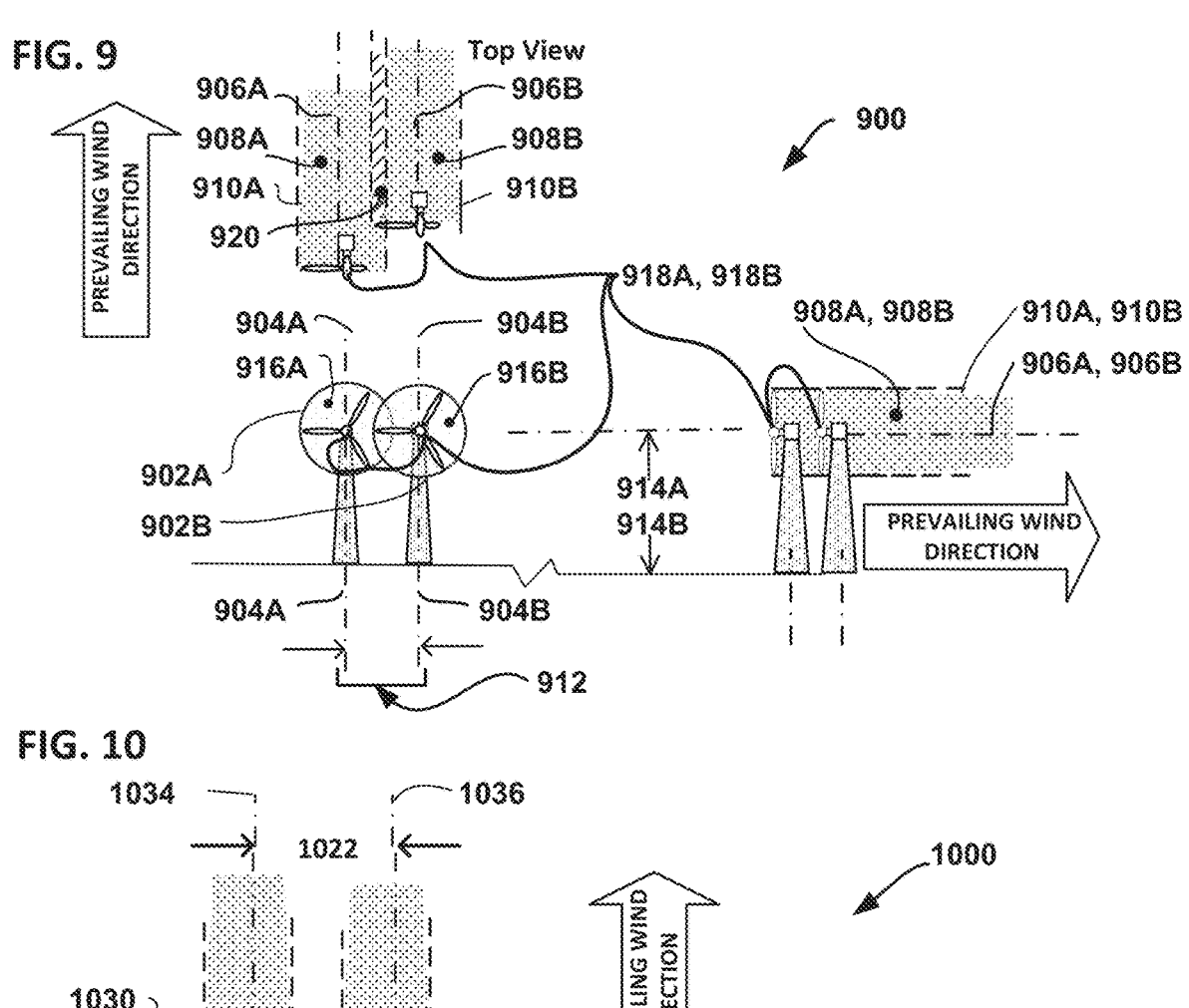
FIG. 9 is illustrative representation of an orthographic view of a 2×1 matrix module in accordance with embodiments of the present invention.

FIG. 9 is illustrative representation of an orthographic view of a 2×1 matrix module 900 in accordance with embodiments of the present invention. In particular, FIG. 9 illustrates wake interference 920 with the two monopole structures. As illustrated, each wind turbine 902A and 902B is supported by a monopole tower 904A, 904B. The configuration includes wind turbines having a substantially aligned elevation 914A, 914B and unaligned at an offset distance row and column placement. The wake boundaries 910A, 910B and swept areas 916A, 916B overlap causing wakes 908A and 908B to overlap creating wake interference 920 because of the close column placement 912 of the illustrated vertical axis monopole towers 904A, 904B facing the primary wind direction. Also illustrated are wake centerlines 906A, 906B for the corresponding wakes 908A, 908B and the blade center locus for both turbines is illustrated 918A, 918B.

Figure 10:
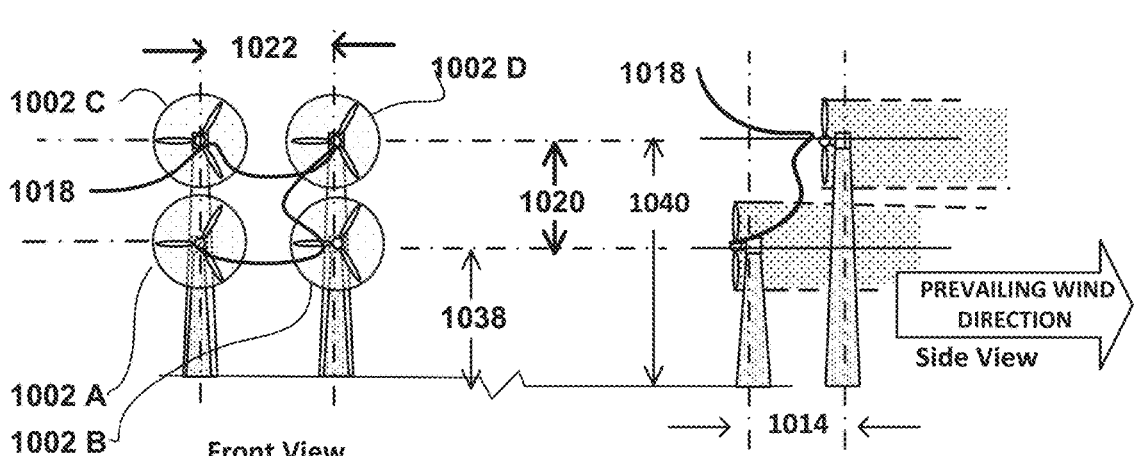
FIG. 10 illustrative representation of an orthographic view of a 2×2 matrix module in accordance with embodiments of the present invention.

FIG. 10 illustrative representation of an orthographic view of a 2×2 matrix module 1000 in accordance with embodiments of the present invention. In particular, FIG. 10 is provided as example embodiments and should not be construed as limiting with respect to any of placement, orientation, or support structures. As illustrated, a 2×2 module 1000 of four turbines 1002 A-D is shown where the rear wind turbines 1002 C & D substantially align along row 1030 and the right-side wind turbines 1002 B & D substantially align along column 1036. The forward wind turbines are aligned along elevation 1038 and the rear turbines are aligned along elevation 1040. In contrast, the forward and rearward turbines are unaligned at an offset distance with respect to elevation. The left-side turbines are aligned along column 1034. Further illustrated are wake row separation distance 1022, wake column separation distance 1014, and wake elevation separation distance 1020, all measured from the blade center locus 1018. FIG. 10, 1000 illustrates the distance between the blade center loci 1020 is equal to the elevation separation distance 1020 in the arrangement of module 1000.

Figure 11:
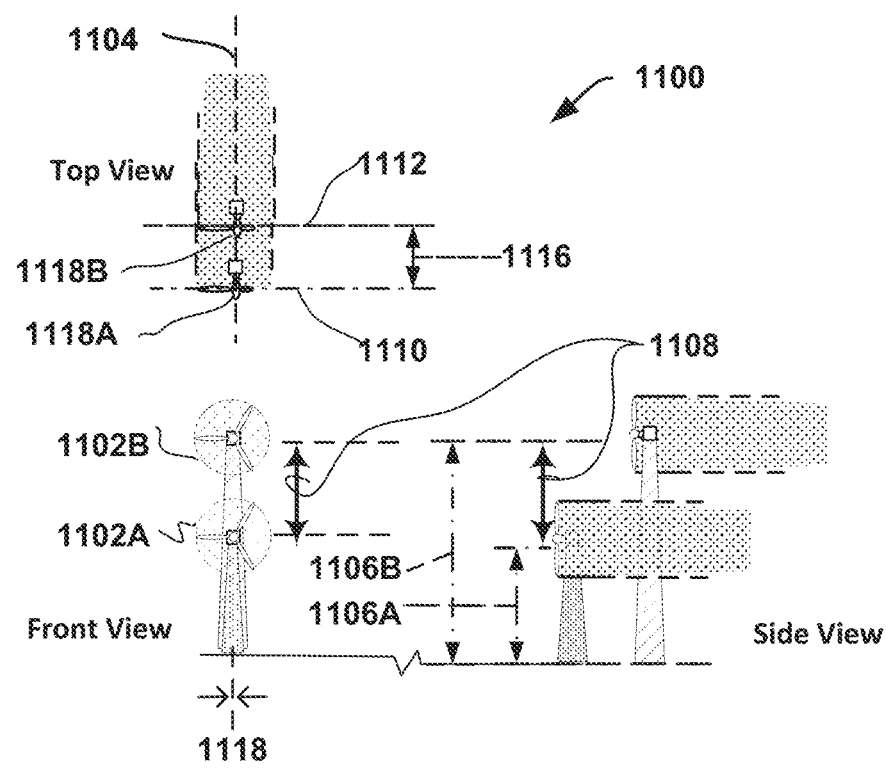
FIG. 11 is an illustrative representation of vertical 1×2 wind turbine module configuration with monopole structures in accordance with embodiments of the present invention.

FIG. 11 is an illustrative representation of vertical 1×2 wind turbine module 1100 configuration with monopole structures in accordance with embodiments of the present invention. As illustrated, the wind turbines 1102A and 1102B substantially align along column 1104. The rearward and forward wind turbines, however, are at different elevations 1106A and 1106B and on different rows, 1110, 1112. In addition, the turbines are positioned to create wake separation distance 1108 in the elevation dimension measured between the blade center loci 1118A, 1118B, thereby avoiding wake interference. In embodiments, as noted above, blade center loci are separated by approximately 0.5 to 4.0 turbine diameters. Also illustrated is zero separation on rows (only one row) 1118, and different separations 1116 for columns 1104 and elevations 1106A, 1106B. At least one turbine in a module has a row, column, or dimension separation between blade center loci of approximately 0.5 to 4 diameters, 1108 in this example.

Figure 12:
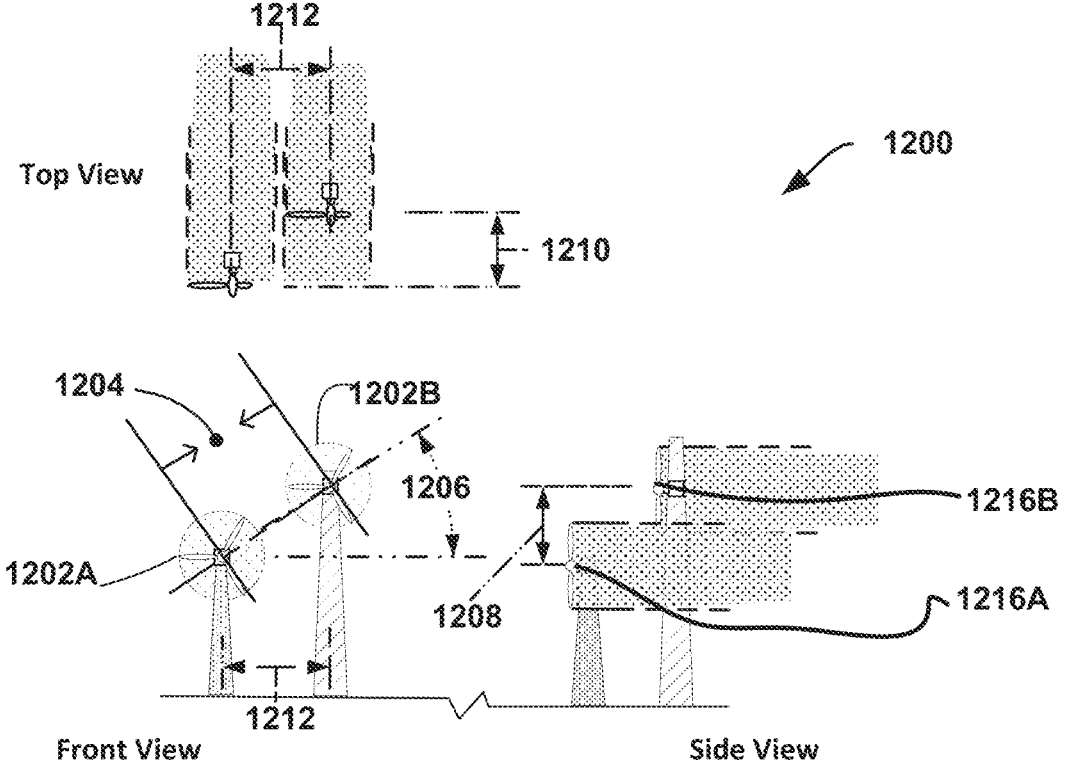
FIG. 12 is an illustrative representation of a turbine module configuration with monopole structures in accordance with embodiments of the present invention.

FIG. 12 is an illustrative representation of a turbine module configuration with monopole structures 1200 in accordance with embodiments of the present invention. In particular, FIG. 12 illustrates a turbine module configuration with monopole structures in which the blade center loci 1216A, 1216B are separated at an angle different from horizontal and different from vertical at an angle 1206, for example, at a distance 1204 along the line between the blade center loci, in accordance with embodiments of the present invention. Illustrated is separations in elevation 1208, separation 1210 in columns, and separations 1212 in row, all different from the blade center loci separation.

Figures 13A, 13B, 13C:
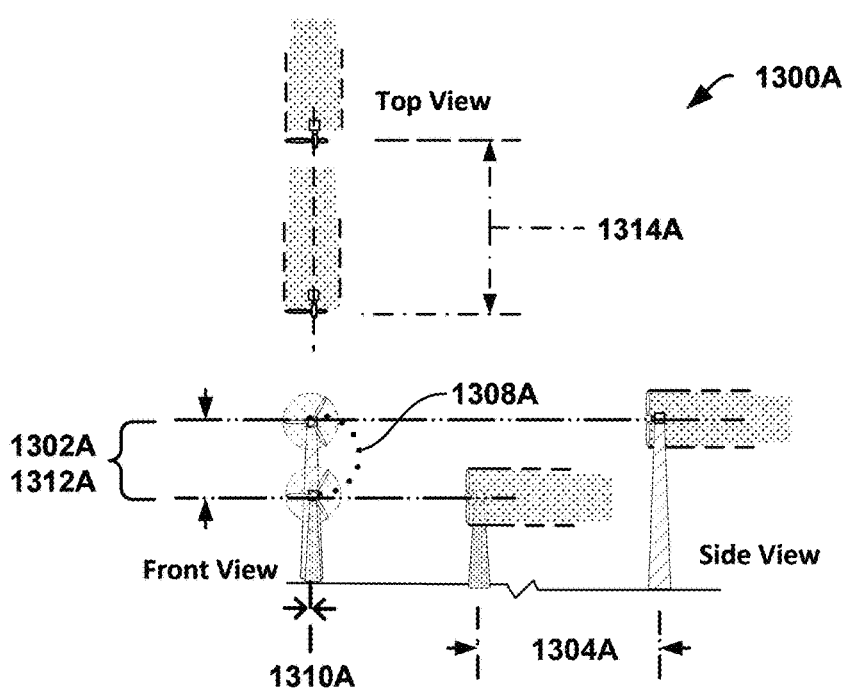
FIGS. 13A-13C are illustrative representations of turbine modules configured with monopole structures in accordance with embodiments of the present invention.

FIGS. 13A-13C are illustrative representations of turbine modules 1300A, 1300B, 1300C configured with monopole structures in accordance with embodiments of the present invention. As illustrated, turbine module embodiments are configured with monopole structures in which the blade center locus are separated at vertically along the elevation dimension FIG. 13A, horizontally along the row direction FIG. 13C, and at an angle 1320 between horizontal and vertical FIG. 13B. and different from vertical and horizontal, in accordance with embodiments of the present invention, while the blade center loci separations 1302A, 1302B, 1302C remain 0.5 to 4 diameters apart along curved path 1308A, 1308B, and 1308C. The separation of the blade center loci remains the same along the curved path, while the elevation separation 1312A, 1312B, 1312C may change, the row separations may change 1310B, 1310C, 1310A; 1310A is zero in FIG. 13A. The column separation distances may also change 1314A, 1314B, 1314C.

FIG. 14 is an illustrative representative of a wind farm layout in accordance with embodiments of the present invention. As illustrated, a module 1400 of two turbines is illustrated, with turbines 1402A, 1402B with different elevations 1414A, 1414B for turbine 1402A relative to turbine 1402B, with their blade center loci 1416A, 1416B separated by 0.5 to 4 diameters 1404 thereby defining a module. In this matrix with column unaligned at an offset distance, row aligned and with the elevation separation distance approximately 0.5 to 4 diameters for at least two turbines, the elevation separation 1408 is also equal to the blade center locus separation 1404. For module 1400, row and column separation distances 1410 and 1412 are much larger or smaller than 0.5 to 4 diameters of the elevation and blade center locus separation and can be different from each other. Module 1400 is illustrative of a column separation distance 1412 of zero when turbines are located on the same row. When the blade center locus separation for at least two turbines is 0.5 to 4 diameters in any dimension or angle, the elevation, row, and column separations can be any distance, without limit. The distances may be set by the wind farm designer to achieve the desired performance. The top view may appear to illustrate a conventional wind turbine layout, but those skilled in the art will recognize that review of the orthographic figure of a module 1400 with two different, very close vertical elevations with differences of 0.5 to 4 diameters are not conventional wind farms. Turbines arranged in modules with blade center locus distances between at least two turbines in a module between approximately 0.5 and 4 diameters are not conventional wind farms. The module separation is not labeled on FIG. 14 but it can be any separation without limit. Separations of modules less than 4 diameters are likely not useful and separations greater than approximately 30 diameters are allowed, but also likely not useful.

FIG. 15 is an illustrative representative of a wind farm layout in accordance with embodiments of the present invention. As illustrated, a 2×2 module 1500 of four turbines is illustrated, with turbines 1502A, 1502B, 1502C, 1502D with different elevations 1514A, 1514B for turbines 1502A-1502B relative to turbines 1502C-1502D, with their blade center loci 1516A, 1516C separated by 0.5 to 4 diameters 1504. Blade center loci 1516B, 1516D are also separated by 0.5 to 4 diameters 1504, thereby defining a module. In this 2×2 matrix with columns aligned and with the elevation separation distance approximately 0.5 to 4 diameters for at least two turbines, the elevation separation 1508 is also equal to the blade center locus. For module 1500, row and column separation distances 1510 and 1512 are much larger than 0.5 to 4 diameters of the elevation and blade center locus separation and can be different from each other. When the blade center locus separation for at least two turbines is 0.5 to 4 diameters in any dimension or angle, the elevation, row, and column separations can be any distance, without limit. The distances may be set by the wind farm designer to achieve the desired performance. The top view may appear to illustrate a conventional wind turbine layout, but those skilled in the art will recognize that review of the orthographic figure of a module 1500 with two different, very close vertical elevations with differences of 0.5 to 4 diameters are not conventional wind farms. Turbines arranged in modules with blade center locus distances between at least two turbines in a module between approximately 0.5 and 4 diameters are not conventional wind farms. The module separation is not labeled on FIG. 15 but it can be any separation without limit. Separations of modules less than 4 diameters are likely not useful and separations greater than approximately 30 diameters are allowed, but also likely not useful.

FIG. 16 is an illustrative representative of a wind farm layout in accordance with embodiments of the present invention. Illustrated is a wind farm arrangement, and the positioning of modules in a wind farm 1620 and 1650 with two alternate definitions of modules, one with 4 turbines 1614,1654 and one with 12 turbines 1612 all referenced to wind rose 1600 and 1640, prevailing wind directions 1602, 1604, 1642, 144 in accordance with embodiments of the present invention. The number of turbines in a module and their orientation are selected by the wind farm designer to improve wind farm energy output based on the wind rose, and different numbers of turbines and orientations may be selected.

Figure 17:
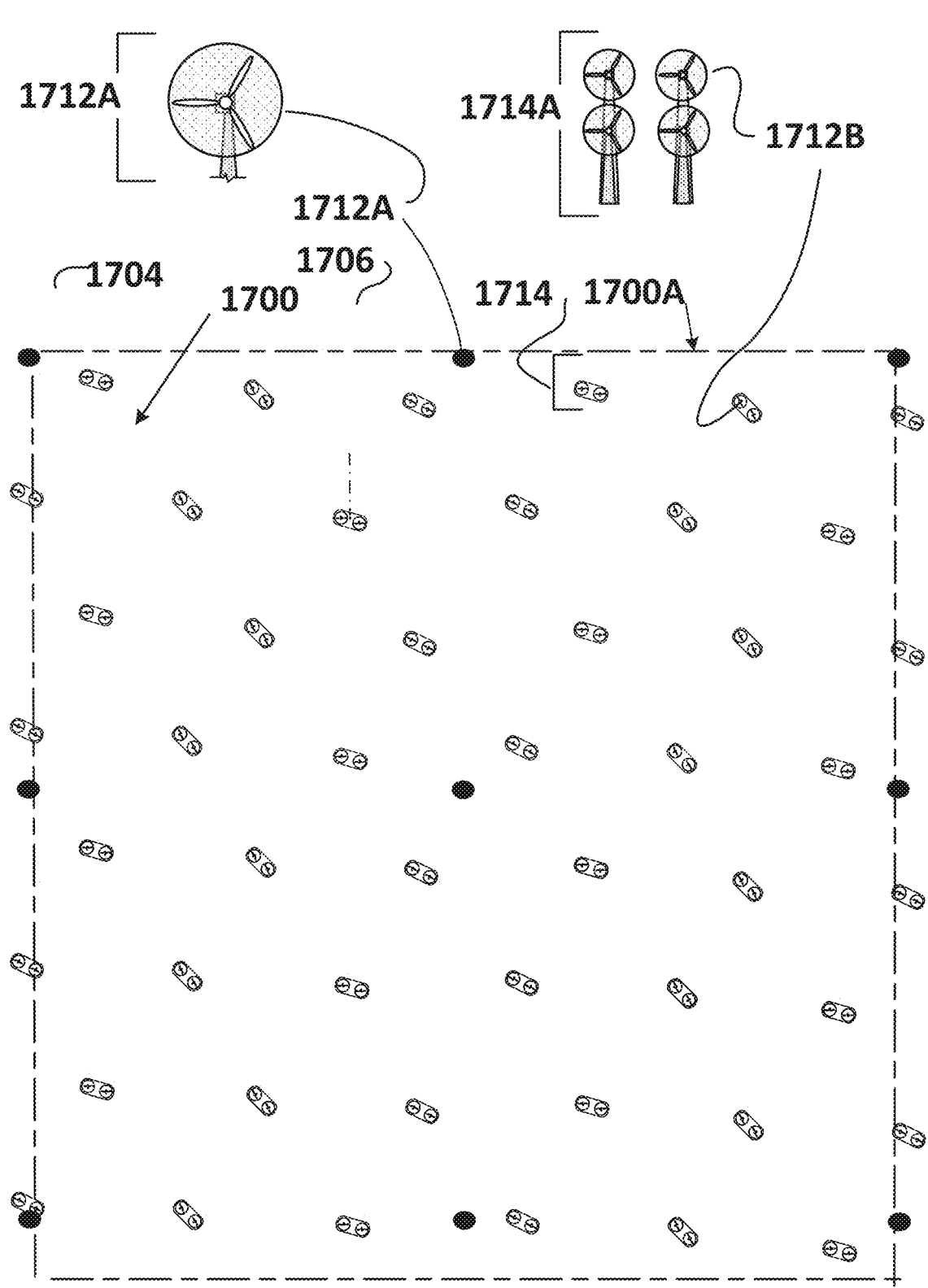
FIG. 17 is an illustrative representative of a wind farm layout in accordance with embodiments of the present invention.

FIG. 17 is an illustrative representative of a wind farm layout for wind rose FIG. 8, 800 in accordance with embodiments of the present invention. In some embodiments, each module may be rotated with respect to another at any angle. These arrangements allow for maintaining a separation of approximately 0.5 to 4 diameters between at least two turbines within a module and much larger distances between modules. Other module positions are suitable for wind rose 800 and other wind roses. FIG. 17 illustrates one possible layout of a layout of a wind farm 1700 in accordance with embodiments of the present invention installed in approximately the same farm area as a conventional wind farm 1700A, both farms aligned to wind rose FIG. 8 0800. As illustrated, wind farm 1700A applies 9 large diameter turbines 1712A while wind farm 1700 applies 48 modules of smaller turbines 1712B in 4×4 matrix modules 1714A.

Figure 18:
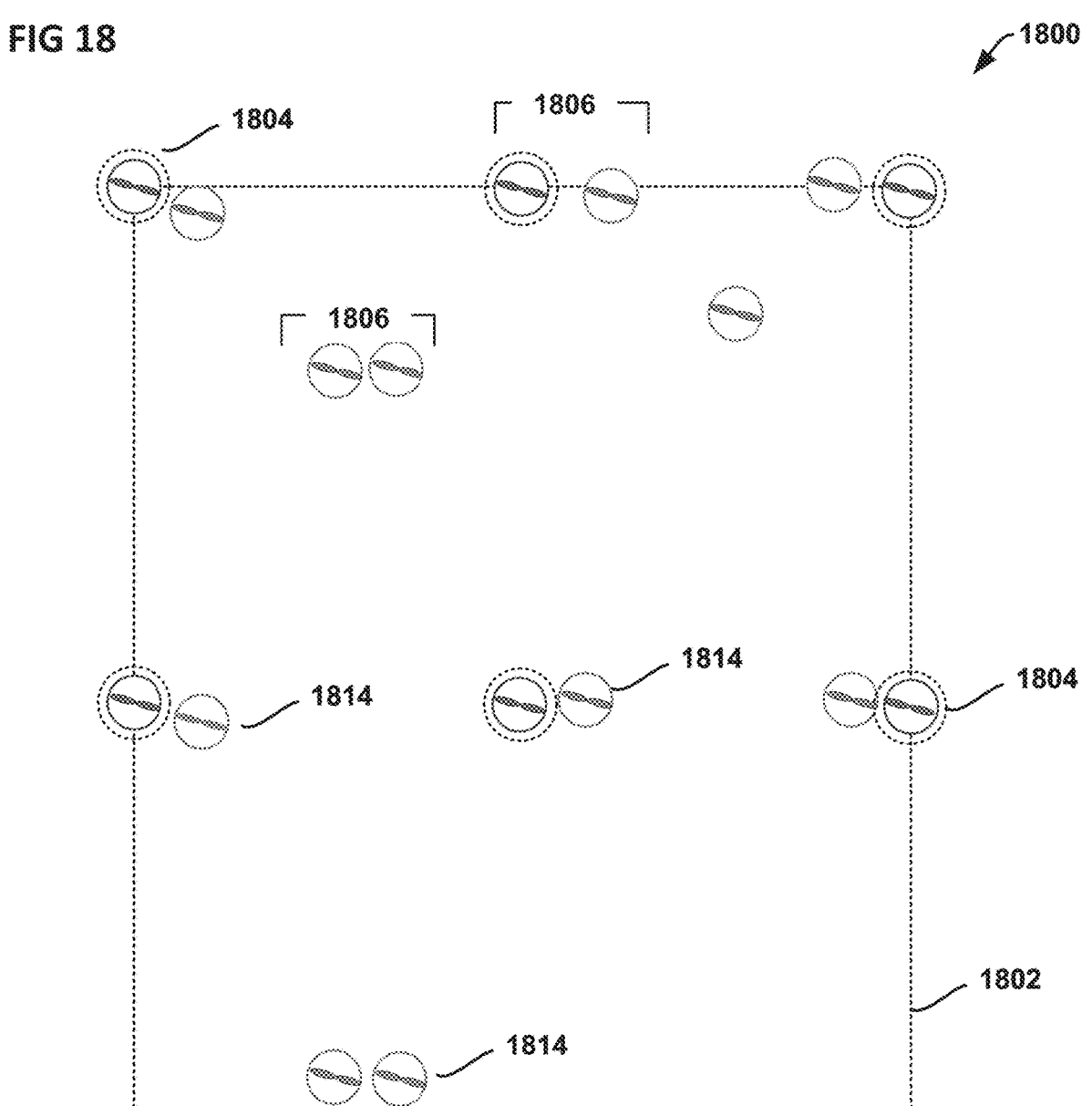
FIG. 18 is an illustrative representative of a wind farm layout in accordance with embodiments of the present invention.

FIG. 18 is an illustrative representative of a wind farm layout in accordance with embodiments of the present invention. FIG. 18 illustrates how embodiments described herein may be further utilized to augment a conventional wind farm by adding additional monopole supported wind turbines to the existing wind farm using techniques and methods provided herein. Additional monopole supported wind turbines may be interspersed with existing structures or be set apart from existing structures without limitation and without departing from embodiments disclosed herein. Wind farm 1800 illustrates an existing conventional wind farm where additional turbines 1814 can be installed within the conventional farm turbines 1804 by embodiments described herein. FIG. 18 is an illustrative representation of adding new wind turbines 1814 to turbines 1804 an existing wind farm 1800 by creating modules 1806 in accordance with embodiments of the present invention.

Methods for Configuring a Wind Farm

FIG. 19 is an illustrative flow chart 1900 of methods for configuring a wind farm in accordance with embodiments of the present invention. At a first step 1902, the method creates a rose graph of an area designated for a wind farm embodiment. A rose graph is disclosed in detail above for FIG. 8. In general, a rose graph graphically illustrates a number of wind characteristics for a given area. In embodiments, wind characteristics include: wind direction, wind speed, and wind duration. From these wind characteristics, the method continues to a step 1904 to determine prevailing wind directions by analyzing the wind graph. In embodiments, prevailing wind directions are based on highest wind direction and speed probability distributions. In many areas several prevailing wind directions may be found having the same or different direction and speed probability distributions.

For example, as illustrated in FIG. 8, three prevailing wind directions 802, 804, and 806 are illustrated where prevailing wind direction 802 has the highest wind direction and speed probability distribution and prevailing wind directions 804 and 806 have lower wind direction and speed probability distributions. In some embodiments at least one highest wind direction and speed probability distribution is found. In embodiments, prevailing wind directions are based on highest wind direction and speed probability distributions. In some embodiments at least one highest wind direction and speed probability distribution is found. In many wind resources only two prevailing wind directions may be found. For example, as illustrated in FIG. 8, wind rose 850 has only two prevailing wind directions illustrated as prevailing wind direction 852, 854. The wind direction approximately 180 degrees from the one or more determined prevailing wind directions are included in the determined prevailing wind direction and do not create a separate prevailing wind direction, regardless of its magnitude.

Returning to FIG. 19, at a next step 1906, the method orients the modules in a fixed module orientation such as illustrated in FIG. 2 and FIGS. 14-18. In embodiments, each module is oriented to approximately 90° (optimum wind angle) plus or minus 25° from its corresponding prevailing wind direction maximize wind farm output. In this manner, each module in a farm is oriented to a corresponding prevailing wind direction. At a next step 1908, the method determines which turbines to idle. At a next step 1910, the method places modules in a fixed positions such as illustrated for FIG. 16. In some embodiments there may be more than one module construction.

Methods for Controlling a Wind Farm

FIG. 20 is an illustrative flow chart 2000 of methods for controlling a wind farm in accordance with embodiments of the present invention. In particular, flow chart 2000 illustrates an overview of control methods for a wind farm. As such, at a first step 2002, the method sets initial conditions and determines status for a current turbine. As utilized herein, a current turbine is a turbine currently under inspection by methods disclosed herein. A step 2002 will be discussed in further detail below for FIGS. 21 and 22. At a next step 2004, the method determines turbine control mode and continues to a step 2006 to tune the current turbine. Steps 2004 and 2006 will be discussed in further detail below for FIG. 21, FIG. 22 and FIG. 23. At a next step 2008, the method selects a next turbine and continues to a step 2010 to determine whether all turbines have been evaluated. If the method determines at a step 2010 that not all turbines have been evaluated, the method returns to a step 2002. If the method determines at a step 2010 that all turbines have been evaluated, the method ends.

Figure 21:
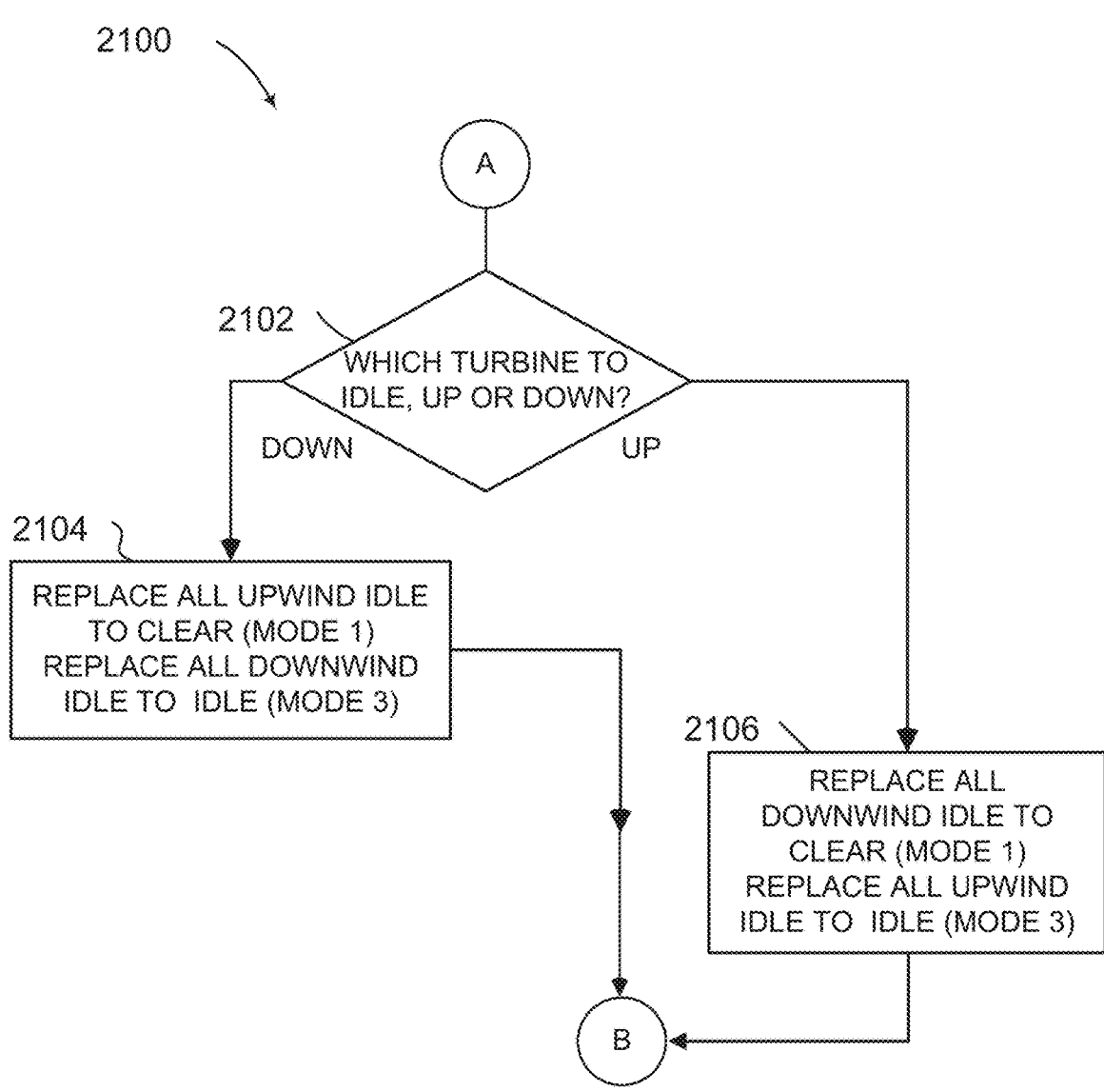
FIG. 21 is an illustrative flow chart of methods for controlling a wind farm in accordance with embodiments of the present invention.

FIG. 21 is an illustrative flow chart of methods for controlling a wind farm in accordance with embodiments of the present invention. In particular, the method illustrated in FIG. 21 continues from FIG. 22 and proceeds to FIG. 23. At a first step 2102, the method determines which turbine to idle up or down. If the method determines at a step 2102 to idle down the turbines, the method continues to a step 2104 to replace all upwind turbine settings from idle to clear (mode 1) and to replace all downwind turbine settings from idle to idle (mode 3). If the method determines at a step 2102 to idle up the turbines, the method continues to a step 2106 to replace all downwind turbine settings from idle to clear (mode 1) and to replace all upwind turbine settings from idle to idle (mode 3), whereupon the method continues to FIG. 23.

Figure 22:
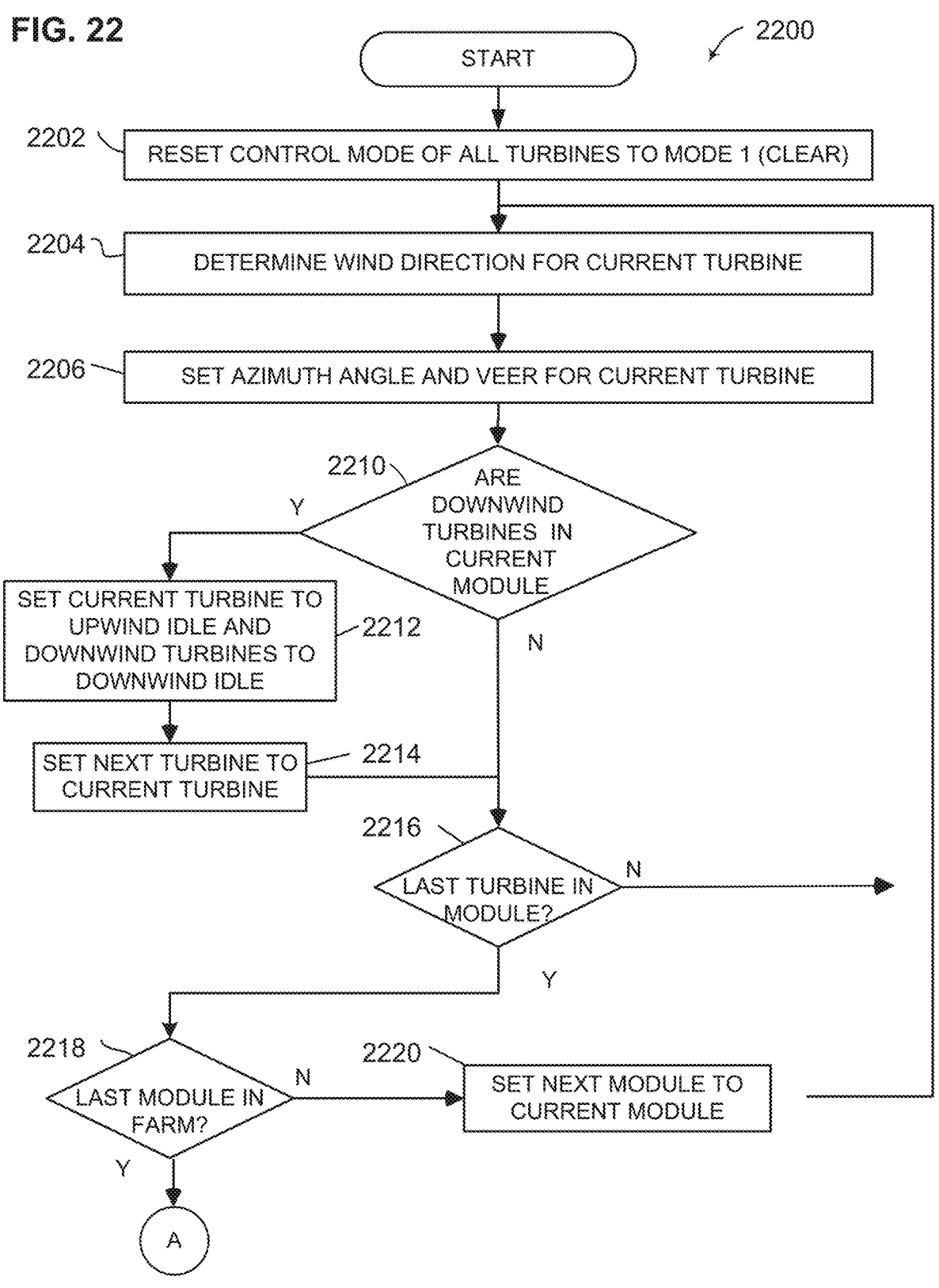
FIG. 22 is an illustrative flow chart of methods for controlling a wind farm in accordance with embodiments of the present invention.

FIG. 22 is an illustrative flow chart 2200 of methods for controlling a wind farm in accordance with embodiments of the present invention. In particular, flow chart 2200 further illustrates methods corresponding with a step 2002 FIG. 20. As such, at a first step 2202, the method sets initial conditions. That is, setting the control mode of all turbines in a module to Mode 1, Clear. At the next step 2204 the method determines the wind direction for the current turbine. In embodiments, wind direction may be determined in any manner known in the art without limitation. At a next step

2206, the method sets azimuth angle and veer for the current turbine. In embodiments, tabulated data is utilized such as illustrated in FIG. 24, which is an illustrative representation of tables and control diagrams utilized for methods of controlling a wind farm in accordance with embodiments of the present invention. In FIG. 24, Table 2400 includes tabulated data for use in methods provided herein. Table 2400 includes wind direction data 2402, steering data 2404, downwind turbine data 2406, idle setpoint data 2408, control mode data 2410, and turbine I.D. data 2412. Thus, for a determined wind direction, wind direction data 2402 is utilized to find corresponding steering data 2404 to set azimuth angle and veer for the current turbine in a step 2206.

At a next step, 2210, 2212, 2214, and 2216, the method sets the turbines in the current module status to UPWIND IDLE or to DOWNWIND IDLE depending on whether it is upstream or downstream of other turbines. The method continues until all turbines in the current module have been processed. The CONTROL MODE is determined from Table 2400 in FIG. 24. Therein illustrated, control mode data 2410 includes an "IDLE" status (DOWNWIND IDLE or UPWIND IDLE). Thus, it may be seen from the table that for a given wind direction (i.e., 90°), the current turbine is set to "IDLE." The method continues to a step 2218 and 2220 to determine whether all modules have been processed. After all modules have been processed, the method continues to steps illustrated at FIG. 23.

Figure 23:
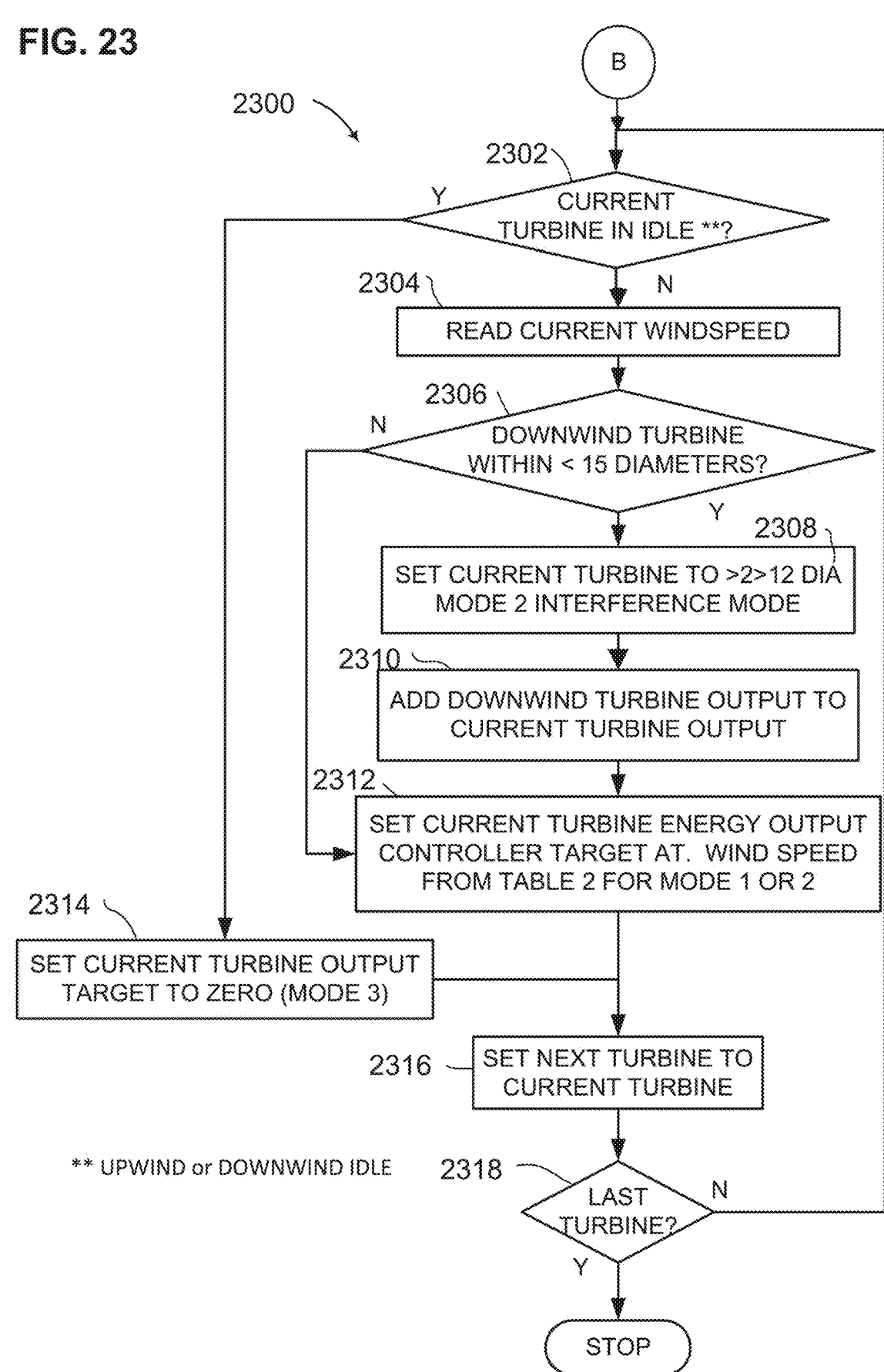
FIG. 23 is an illustrative flow chart of methods for controlling a wind farm in accordance with embodiments of the present invention.

FIG. 23 is an illustrative flow chart 2300 of methods for controlling a wind farm in accordance with embodiments of the present invention. In particular, flow chart 2300 further illustrates methods corresponding with steps 2006 and 2008 FIG. 20 and FIG. 21 steps 2104 and 2106. As such, step 2302, after the method determines that the current turbine is not set to "IDLE," (UPWIND IDLE or DOWNWIND IDLE) the method sets the current turbine to upwind interference mode. Upwind interference mode indicates that there is some upwind interference caused by an upwind turbine. At a next step 2304, the method reads the current wind speed. Steps 2306, 2308, 2310, 2312, and 2314 continue to set the current turbine output target as from tabulated data such as in Table 1 2400, FIG. 24; see 2312. The method then ends.

For the path through FIG. 23, step 2314 after the method determines at step 2302 that the current turbine is set to UPWIND IDLE or DOWNWIND IDLE the method determines presence of a downwind turbine based on the wind direction of the current turbine from tabulated data such as in Table 1 2400, FIG. 24. Downwind turbine data 2406 indicates whether a downwind turbine is present with respect to the current turbine and wind direction. In some embodiments, status is tabulated such as in Table 3 2420, FIG. 24.

If the method determines at step 2306 that there is a downwind turbine within less than 15 turbine diameters of the current turbine, the method continues to a step 2308 to set the current turbine to downwind interference mode. The method continues to a step 2310 to add the downwind turbine output to the current turbine output for purposes of tuning based on total output of the current turbine output plus the downwind turbine output. The method continues to a step 2312 to set the current turbine energy output controller target based on wind speed from tabulated data such as Table 2 2450, FIG. 24, whereupon the method continues to the next turbine at step 2316 until all turbines have been processed and the method ends, steps 2318, 2320. Turning to FIG. 24, Table 2 includes windspeed data 2452, non-interference mode data 2454, and downwind interference mode data 2456, which include output setpoints for controlling output of the current turbine. For clarity, the following Table A is provided for the various control modes as contemplated herein:

TABLE A

| Mode 1 | Non-interference mode | No interference from upwind turbine<br>All downwind turbines are >15 diameters<br>Interference to downwind turbine in same module that is set to Idle status |
| Mode 2 | Downwind interference mode | Current turbine wake interferes with downwind turbine not in the same module as current turbine |
| Mode 3 | Upwind interference mode | Upwind interference from turbine in the same module, set the current turbine to Idle |

FIG. 24 is an illustrative representation of tables and control diagrams utilized for methods of controlling a wind farm in accordance with embodiments of the present invention. As illustrated, Table 1 2400 includes wind direction data 2402, steering data 2404, downwind turbine data 2406, idle setpoint data 2408, control mode data 2410, and turbine I.D. data 2412. Further illustrated is Table 2 2450 that includes windspeed data 2452, non-interference mode data 2454, and downwind interference mode data 2456, which include output setpoints for controlling output of the current turbine. Still further illustrated is Table 3 2420 that includes the current status modes 2422 for all turbines as they are modified by the control. Further, Table 4 2440 includes the current dynamic energy output for all turbines as the control tunes the turbine for changes in the wind speed and direction. It may be seen that data from the various tables provide input to output controller 2430 utilizing methods disclosed herein.

Benefits Over Conventional Wind Farms

Increased wake interference is created in some turbines but the resulting damaging fatigue stress can be mitigated by idling one or more turbines.

Energy can be maximized by installing modules in specific arrangements, aligned to one or more specific compass direction for one or more selected prevailing wind directions.

Wake interference can be offset by the controls by several methods:

The controls optimize the output from the upwind rotor plus a rotor downwind approximately 10 diameters downwind.

A downwind rotor or an upwind rotor very closely spaced in the same structure (module) can be set to produce no energy, leaving the wind resource for the other rotor and significantly minimizing fatigue damage from turbulence in the upwind turbine wake.

Other sharing of the wind resources can be employed for rotors sharing the same wind stream, i.e., wake interference.

Alternative Embodiments

Figure 25:
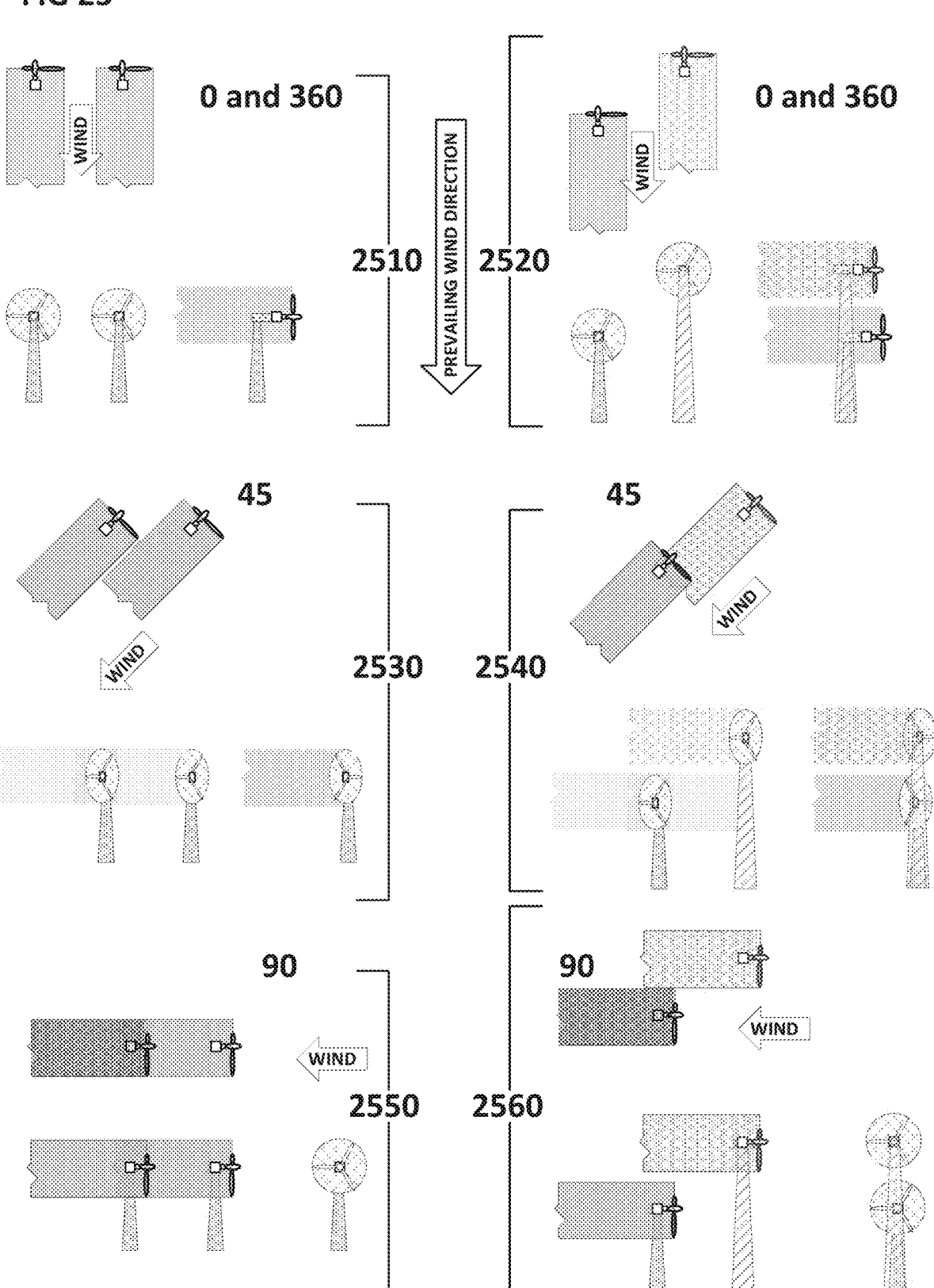
FIG. 25 is an illustrative representative of a wind farm layout in accordance with embodiments of the present invention.
Figure 26:
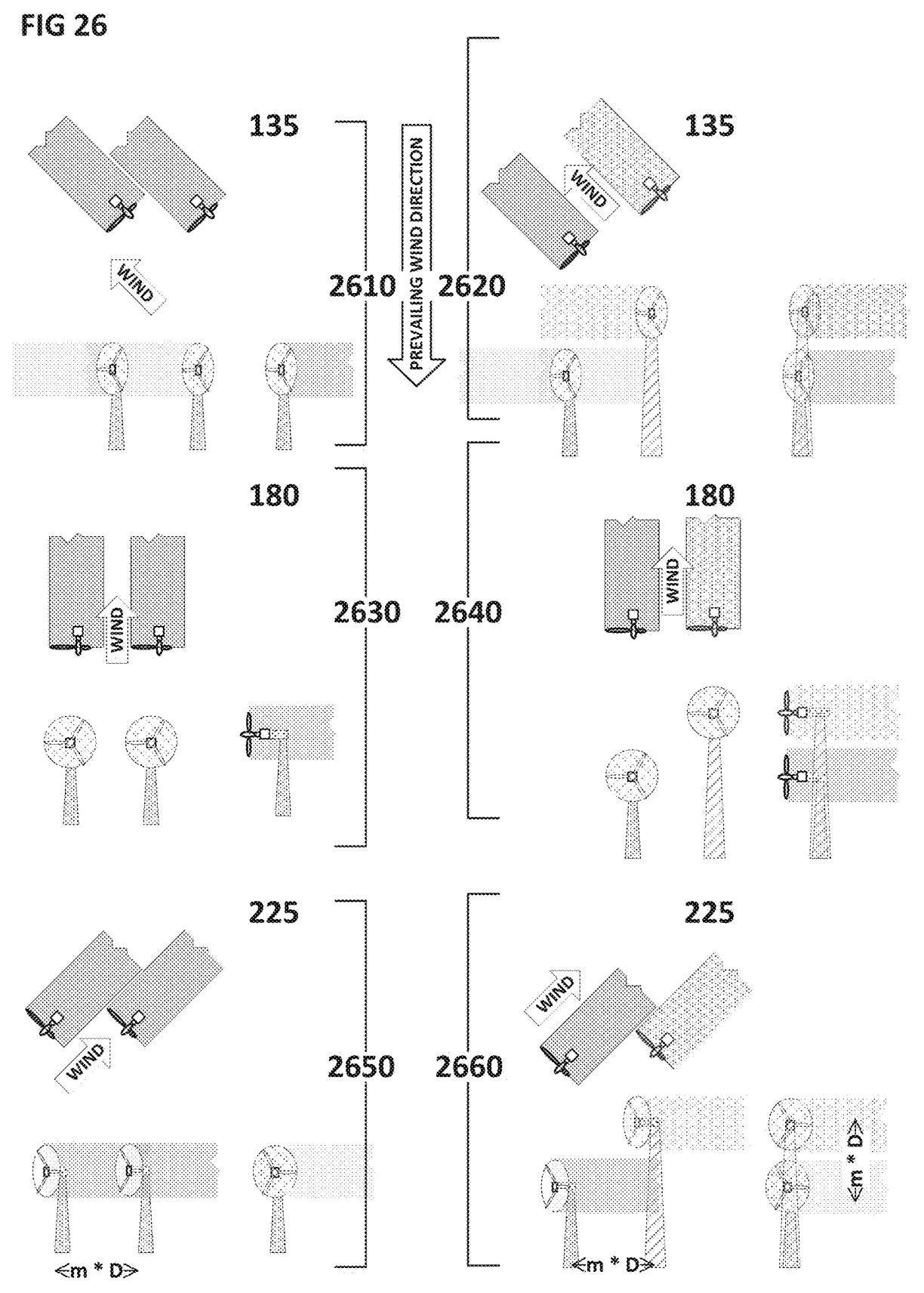
Figure 27:
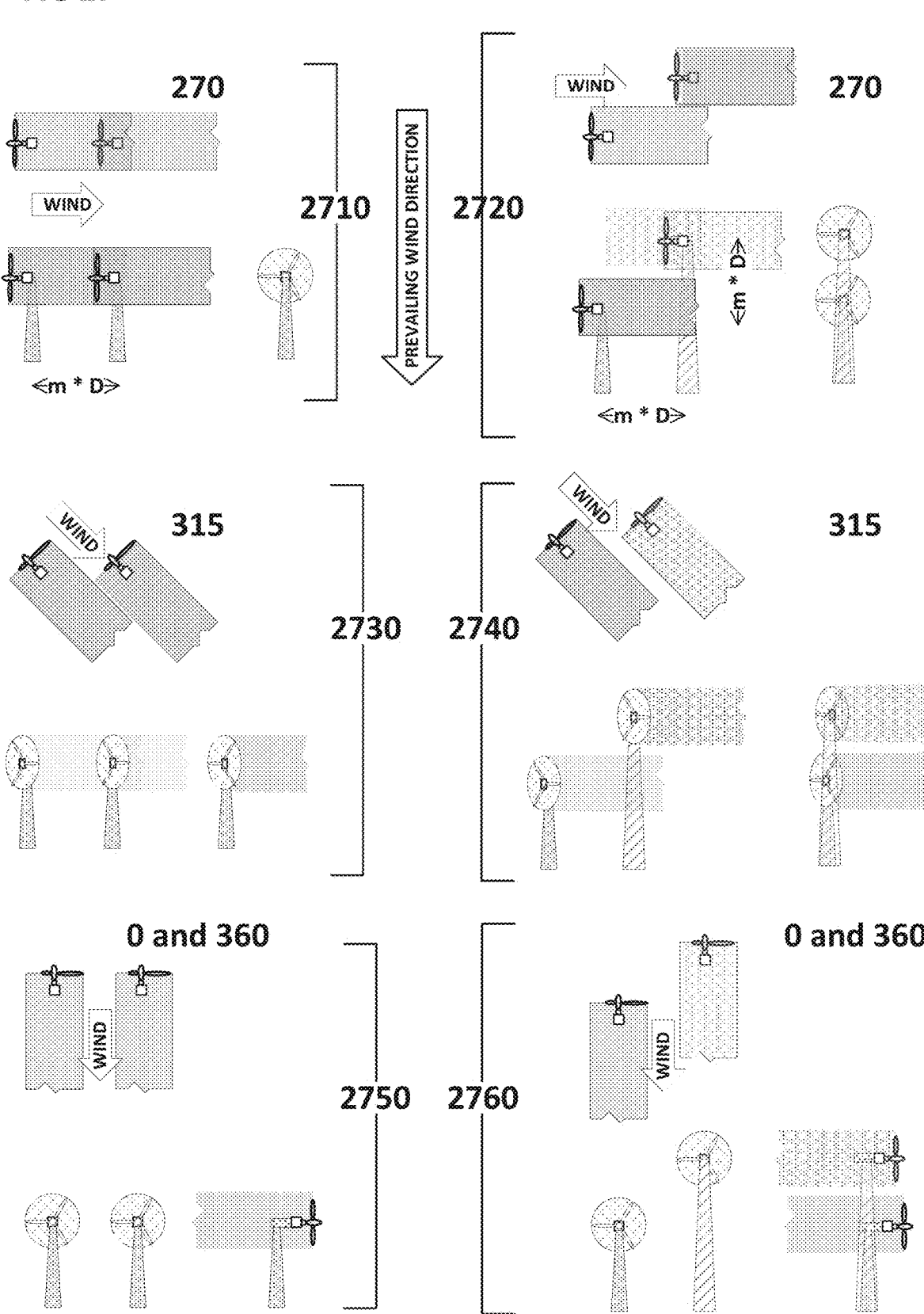
FIG. 27 is an illustrative representative of a wind farm layout in accordance with embodiments of the present invention.

FIGS. 25-27 illustrate module performance through a variety of wind directions from the prevailing wind direction. FIG. 25 is an illustrative representative of a wind farm layout in accordance with embodiments of the present invention. In particular, FIG. 25 is an illustrative representation of 1×2 and 2×1 modules' wake interference from wind directions 0 through 90 degrees from the prevailing wind direction. For a 2×1 and 1×2 matrix turbine 2510, 2520 there is no wake overlap or interference at zero degrees, the prevailing wind direction for the illustrated figure. When the wind direction shifts approximately 45 degrees from the prevailing wind direction, depending on the spacing between the turbines, the two wakes of the 2×1 matrix 2530 just begin to interact but with little overlap and wake interference. Because of the elevation difference in a 1×2 module, 2540 there is no wake overlap or interference at 45 degrees from the prevailing wind direction. When the wind shifts approximately 90 degrees from the prevailing wind direction, the wakes of the 2×1 module 2550 are fully overlapped for maximum wake interference and turbulence. Turbulence fatigue is mitigated by embodiments of this invention by reducing the output to the upwind turbine, the downwind turbine, or both. Because of the elevation difference in a 1×2 module 2560, there is no wake overlap or interference at 90 degrees from the prevailing wind direction.

FIG. 26 is an illustrative representative of a wind farm layout in accordance with embodiments of the present invention. In particular, FIG. 26 is an illustrative representation of 1×2 and a 2×1 modules' wake interference from wind directions 135 through 225 degrees from the prevailing wind direction. For 2×1 and 1×2 matrix modules 2610, 2620, when the wind direction shifts to approximately 135 degrees from the prevailing wind direction, depending on the spacing between the turbines, the two wakes of the 2×1 matrix 2610 just begin to interact but with little overlap and wake interference. Because of the elevation difference in a 1×2 module 2620, there is no wake overlap or interference at 135 degrees from the prevailing wind direction. For a 2×1 and 1×2 matrix turbine 2630, 2640 there is no wake overlap or interference at 180 degrees from the prevailing wind direction. For 2×1 and 1×2 matrix modules 2650, 2660, when the wind direction shifts to approximately 225 degrees from the prevailing wind direction, depending on the spacing between the turbines, the two wakes of the 2×1 and 1×2 matrix 2650, 2660 just begin to interact but with little overlap and wake interference.

FIG. 27 is an illustrative representative of a wind farm layout in accordance with embodiments of the present invention. In particular, FIG. 27 is an illustrative representation of 1×2 and 2×1 modules' 2710, 2720 wake interference from wind directions 270 through 360 degrees from the prevailing wind direction. At 270 degrees from the prevailing wind direction, the wakes of the 2×1 module 2710 are fully overlapped for maximum wake interference and turbulence. Turbulence fatigue is mitigated by embodiments of this invention by reducing the output to the upwind turbine, the downwind turbine, or both. Because of the elevation difference in a 1×2 module 2720, there is no wake overlap or interference at 270 degrees from the prevailing wind direction. When the wind direction shifts to approximately 315 degrees from the prevailing wind direction, depending on the spacing between the turbines, the two wakes of the 2×1 matrix 2730 just begin to interact but with little overlap and wake interference. Because of the elevation difference in a 1×2 module 2740, there is no wake overlap or interference at 315 degrees from the prevailing wind direction. For a 2×1 and 1×2 matrix turbine 2750, 2760 there is no wake overlap or interference at 360 degrees, returning full circle to 0 degrees—the prevailing wind direction.

Figure 28:
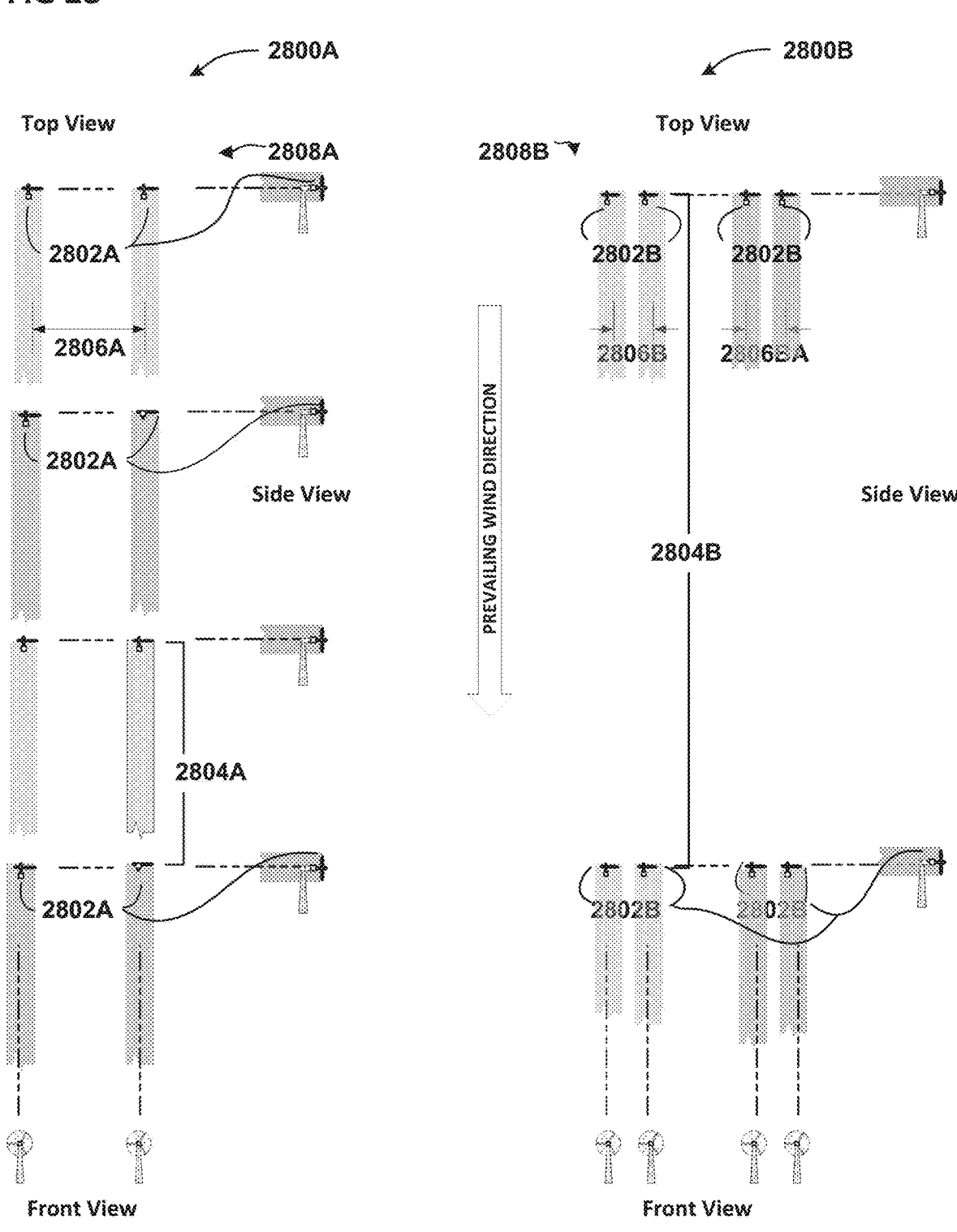
FIG. 28 is an illustrative representative of a wind farm layout in accordance with embodiments of the present invention.

FIG. 28 is an illustrative representative of a wind farm layout in accordance with embodiments of the present invention. In particular, FIG. 28 is top and side view illustrative representation of two eight-turbine-wind farm arrangements in the prevailing wind direction, a conventional wind farm layout 2800A, and one module wind farm layout according to embodiments herein with 2×1 turbines in modules, 2800B. All eight turbines in both farms are labeled 2802A and 2802B respectively. Also shown are the separation distances in diameters 2804A and 2804B in the prevailing wind direction, the one with the most wind energy. The wake recovery distance in a conventional wind farm uses an average of 8 diameters or greater in a single prevailing wind direction. Eight diameters as illustrated 2804A are a compromise between wake loss and site infrastructure conventional wind farm designers select. Significantly lower wake turbulence and greater energy output is achieved at a prevailing wind direction through much longer separating distances 2804B of turbines 2802A in embodiments of this invention as compared to closer separation 2804A of conventional turbines 2802A. Also illustrated is the much closer separation 2806B as compared to conventional turbine separation 2802A, which results in higher wake turbulence and lost energy output from those very close separation at non-prevailing, approximately crosswind direction. The greater separation in the prevailing higher speed wind direction overcomes the losses in the low-speed wind directions for many wind roses.

The module wind farm arrangements embodiments of this invention have approximately two times or more the separation distance 2804B in the prevailing wind directions for much higher energy output than in the conventional wind farm 2804A. This higher energy output is a key factor to offset the lost power in the non-prevailing wind directions for the module wind farm where the spacing in that crosswind wind direction reduces the power from two closely paired turbines by half, that is only the equivalent of one turbine output from two turbines. The reduction of the wake turbulence and increase speed are illustrated by the density of the wakes, shown in the prevailing wind direction. The overall layout of the wind farm into modules is another mitigating factor offsetting the lost power from closely separated turbines 2802B. The turbines of module wind farm 2800B are all at the same elevation and therefore some turbines are subject to large loss of power and wake turbulence, both of which are mitigated by the embodiments of this invention. The wind turbines in conventional farm 2800A are also subject to loss of power when the wakes directly overlap, but at fewer range of wind direction than farm 2500B; however, with only moderate loss because of the larger separation between turbines 2802A in the crosswind directions.

Figure 29:
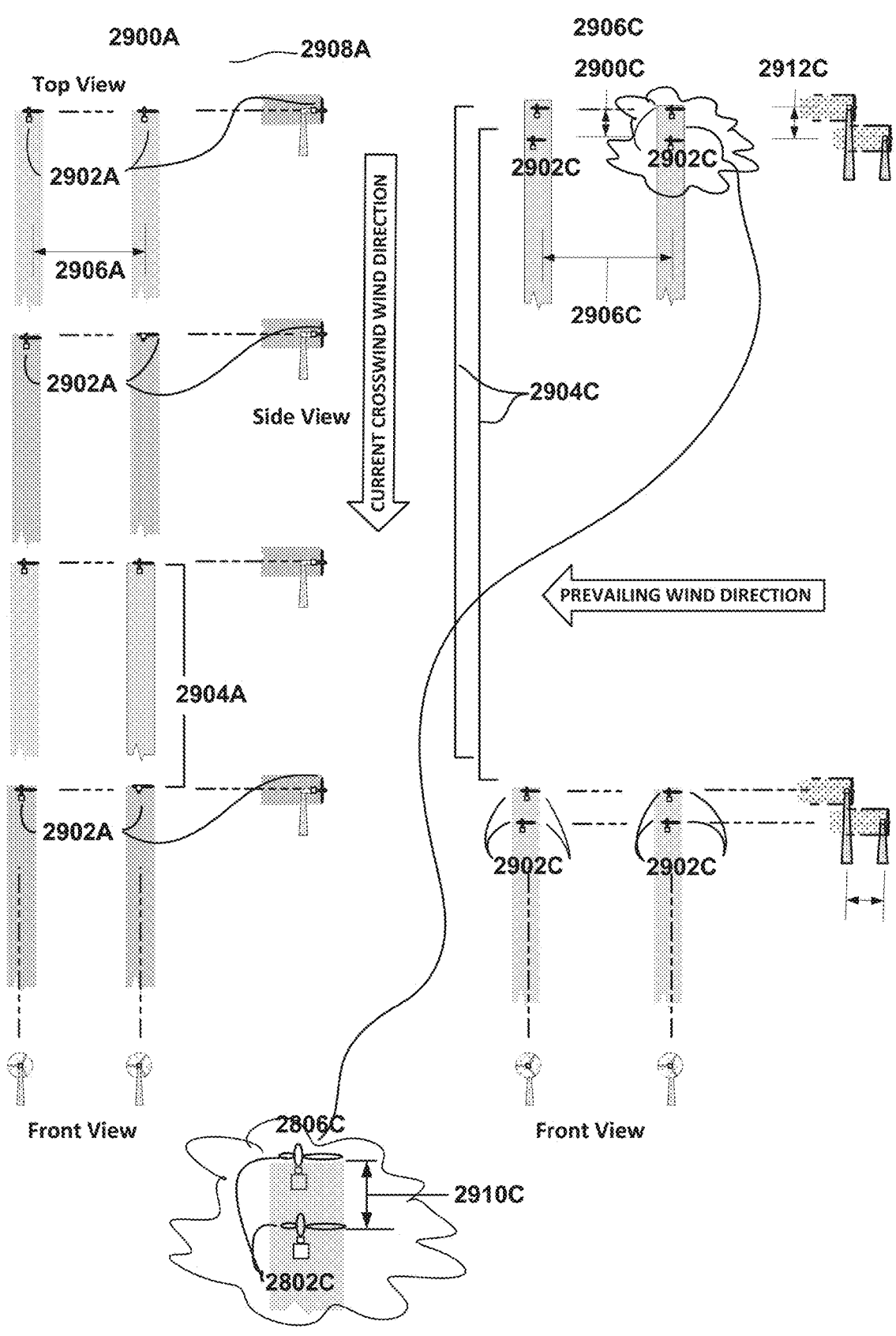
FIG. 29 is an illustrative representative of a wind farm layout in accordance with embodiments of the present invention.

FIG. 29 is an illustrative representative of a wind farm layout in accordance with embodiments of the present invention. In particular, FIG. 29 is top and side views illustrative representation of two eight-turbine-wind farm arrangements in the prevailing wind direction, a conventional wind farm layout 2900A, and one module wind farm layout 2900C according to embodiments herein with 2×1 turbines in modules, 2900C. All eight turbines in both farms are labeled 2902A and 2902C respectively. Also shown are the separation distances in diameters 2904A for the turbines of 2900A and the distance between modules 2904C and the modules of 2904C in the prevailing wind direction, the direction with the most wind energy. The wake recovery distance in a conventional wind farm uses an average of 8 diameters or greater in a single prevailing wind direction. Eight diameters as illustrated 2904A are a compromise between wake loss and site infrastructure conventional wind farm designers select. The wake recovery distance in a module wind farm uses greater than 8 diameters separation 2804C in one or more prevailing wind directions. Significantly lower wake turbulence and greater energy output is
achieved at a prevailing wind direction through much longer
separating distances 2904C in embodiments of this inven-
tion compared to closer separation 2904A of some turbines.
See FIG. 28, 2802B between conventional turbines 2902A.
Also illustrated is the unthinkable very much closer sepa-
ration 2910C compared conventional turbine separation
2904A, which results in higher wake turbulence and lost
energy output from those very close separation at non-
prevailing, approximately crosswind direction. The greater
separation in the prevailing higher speed wind direction
overcomes the losses in the low-speed wind directions for
many wind roses.

Both farm arrangements 2800B (FIG. 28) and 2900C
(FIG. 29) as illustrated are embodiments of this invention
and have approximately two times or more the separation in
the prevailing wind directions for much higher energy
output. This higher energy output is a key factor to offset the
lost power in the non-prevailing wind directions where the
spacing in that crosswind wind direction reduces the power.
The reduction of the wake turbulence and increased speed
are illustrated by the absence of wakes of farm arrangement
2900C. The absence of wakes is a simplification in the
figure, as the wake still exists, just at higher speed and lower
turbulence. The overall layout of the wind farm into modules
is another mitigating factor offsetting the lost power from
closely separated turbines. The turbines of wind farm 2900C
are at two different elevations with their wakes, one above
the other and their wakes do not cross or interfere when their
elevation differences differ by one diameter or more. There-
fore, in the crosswind directions turbines 2902C are not
subject to the large loss of power and wake turbulence, both
of which are also mitigated by the embodiments of this
invention. The wind turbines in conventional farm 2800A
and 2900A are subject to a moderate loss of power when the
wakes directly overlap, lower than farm 2800B, but much
greater than farm 2900C where the wakes do not overlap in
the crosswind directions. Also note that configurations of
wind farms embodied in this invention can be installed in the
same plot area as conventional wind farms (see FIGS. 17,
1700 and 1700A).

Conventional wind farm 2900A suffers from (moderate
wake interference with separation distances of 4 diameters.
The 2×1 matrix wind farm of this invention also suffers from
wake interference, but more severe with the close spacing
0.5 to 4 diameters. In the non-prevailing wind directions,
conventional wind farm layouts are superior to some
embodiments of module wind farms of this invention while
farms embodied by this invention are equal or superior at
higher speed, prevailing wind directions.

For many wind resources, the wind farm design embodied
by this invention provide more total farm output that con-
ventional designs. Without using the embodiments of this
invention, a wind farm applying very close turbines in a
conventional design would have less energy production and
much more turbulence fatigue damage. Therefore, conven-
tional thinking would not consider such close spacing of
wind turbines, 0.5 to 4 diameters because it offers the same
wind production in the prevailing wind direction and much
less energy and severe turbulence fatigue in the off-prevail-
ing wind direction for reduced total farm energy output and
shorter turbine life from fatigue. Close spacing of turbines is
obviously a flawed design in conventional wind farms and is
not obvious that it would be a valid spacing. Here, obvi-
ousness applies in the reverse direction, that is, this very
close turbine spacing in a conventional design is obviously
wrong.

24

For some wind resources, defined by a wind rose, the
embodiments of this invention take advantage of arranging
the turbines into modules for a module wind farm and can
produce more energy than a conventional wind farm. Tur-
bine controls can also be modified appropriately to take
advantage of the embodiments of this invention to further
offset the lost energy from closely spaced turbines in the
non-prevailing wind directions. Some or all of the embodi-
ments of this invention may be required to improve the
energy production over conventional wind farms.

Figure 30:
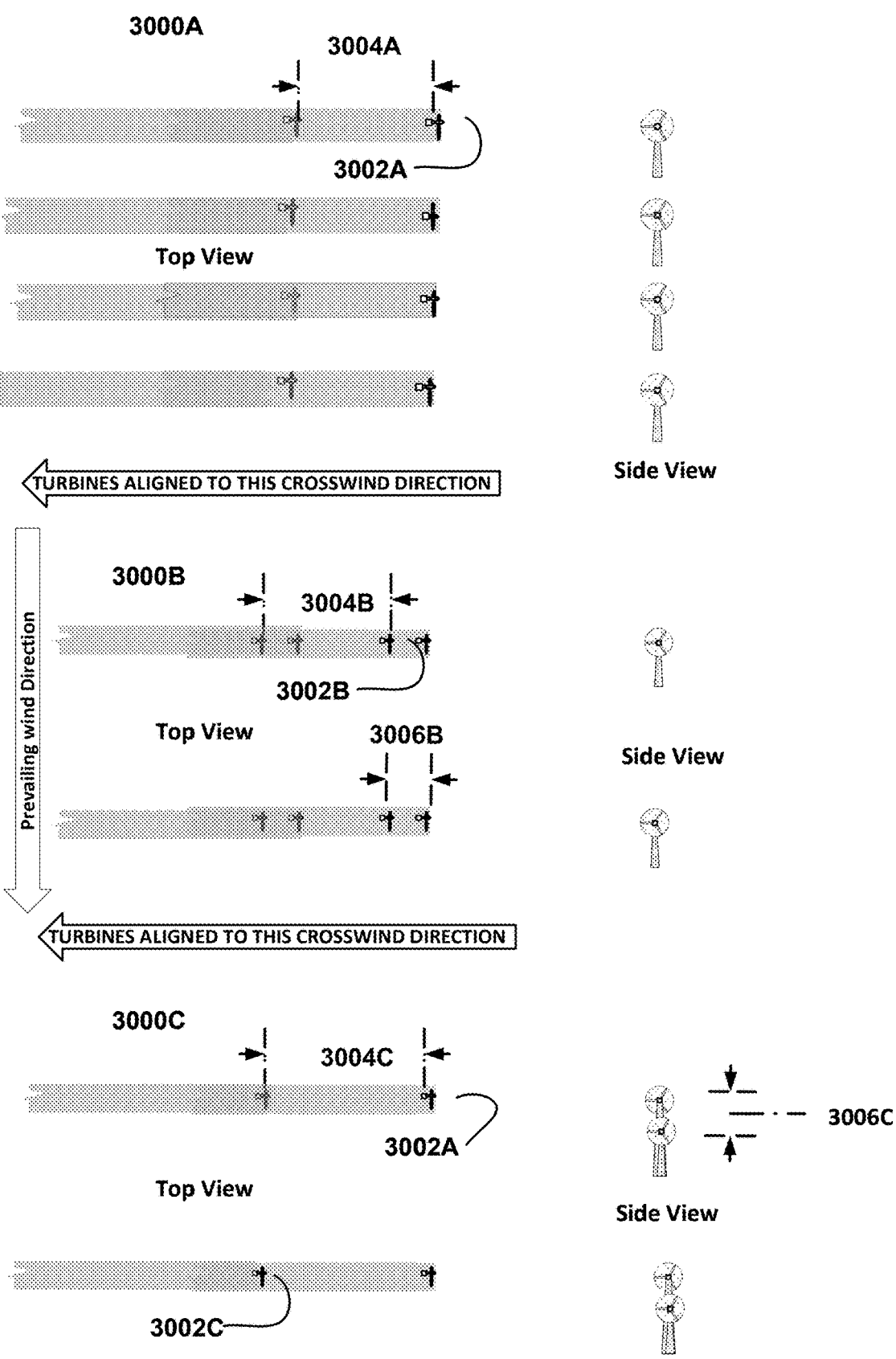
FIG. 30 is an illustrative representative of a wind farm layout in accordance with embodiments of the present invention.

FIG. 30 is an illustrative representative of a wind farm
layout in accordance with embodiments of the present
invention. In particular, FIG. 30 illustrates the top and side
views of the wake overlap interference in the off-prevailing
wind direction, 90 degrees from the prevailing wind direc-
tion of three different wind farms each with 8 turbines. They
are similar to wind farms 2800A, 2900A, 2800B and 2900C
(FIGS. 28 and 29). The differences between the three
eight-turbine farms are described next. FIG. 30 is a repre-
sentation of how the unconventional very close separation of
some turbines results in higher wake turbulence and lost
energy output from the very close separation at non-prevail-
ing, approximately crosswind directions. Conventional wind
farm 3000A turbines and wind farm 3000B turbines embod-
ied by this invention have the same elevation, but wind farm
3000C embodied by this invention has 2 elevations. Con-
ventional wind farm 3000A has 4 or more diameters sepa-
ration 3004A between turbines 3002A in the crosswind
direction while wind farms 3000B and 3000C have 0.5 to 4
diameters separation.

Note that the separation distance is measured along the
line connecting the blades center of rotation, which is the
same as the elevation or row or column distance when the
relative positions of the turbines in a module are aligned
directly horizontal or directly vertical. When they are not
horizontal or vertical, the distance between the blade center
loci will be approximately 0.5 to 4 diameters, the defining
measurement. The elevation and horizontal separation dis-
tances may be different than the distance between the blade
center loci. For simplicity the horizontal or vertical differ-
ences have been utilized herein is to explain the much
smaller separation distance between turbines in modules, but
the distances between the centers of rotation are the defining
measurement embodying this invention.

Both module wind farms 3000B and 3000C embodied by
this invention have 0.5 to 4 diameters between turbines in
modules in the crosswind direction 3004B and 3004C,
approximately corresponding to 8 or more separation 3004A
in wind farm 3000A. The separation distances are greater
than 8 diameters for wind farm 3000A in the prevailing wind
direction (see FIG. 28 and FIG. 29) but can be much greater
than 8 diameters for wind farms 3000B and 3000C (see FIG.
28 and FIG. 29). The greater spacing of module wind farms
3000B and 3000C in the prevailing wind direction allows for
the wake to recover to a higher speed with less turbulence
which is made possible by the area left open by closer
distances between turbines within a module. Wind farms
3000B and 3000C have two separations, a very close one,
0.5 to 4 diameters, in the crosswind direction between
turbines in a module and one much greater than 8 diameters
in the primary wind direction. Wind farm 3000B offsets the
losses from the 0.5 to 4-diameters spacing but regains it with
the greater than 8 diameters separation for some wind
resources. Wind farm 3000C has similar turbine spacing to
wind farm 3000B, but some turbines are at different eleva-
tions, minimizing the wake overlap and interference in the
off-prevailing wind directions.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

While this invention has been described in terms of several embodiments, there are alterations, permutations, and equivalents, which fall within the scope of this invention. It should also be noted that there are many alternative ways of implementing the methods and apparatuses of the present invention. Furthermore, unless explicitly stated, any method embodiments described herein are not constrained to a particular order or sequence. Further, the Abstract is provided herein for convenience and should not be employed to construe or limit the overall invention, which is expressed in the claims. It is therefore intended that the following appended claims be interpreted as including all such alterations, permutations, and equivalents as fall within the true spirit and scope of the present invention.

What is claimed is:

1. A wind turbine farm comprising:
a plurality of steerable wind turbines, wherein
    each of the plurality of steerable wind turbines includes a turbine diameter and a blade center locus, wherein
    each of the plurality of steerable wind turbines are separately and axially steerable about a vertical axis to align with one or more prevailing wind directions, wherein
    the plurality of steerable wind turbines is arranged in one or more modules, wherein
    each of the one or more modules is defined by at least two steerable wind turbines, wherein
    each of the at least two steerable wind turbines in a module is positioned in a fixed position, the fixed position including a horizontal column coordinate, a horizontal row coordinate, and a vertical elevation coordinate such that the blade center loci between at least two of the at least two steerable wind turbines within the module are separated by approximately 0.5 to 4.0 turbine diameters in any horizontal or vertical direction and wherein each of the one or more modules includes an optimum orientation corresponding with the one or more prevailing wind directions that minimizes wake interference between other modules in the wind turbine farm.

2. The wind turbine farm of claim 1, wherein the optimum orientation corresponding with the one or more prevailing wind directions further comprises a range of approximately −25 to +25 degrees.

3. The wind turbine farm of claim 1, wherein
each module is placed in a fixed module placement and oriented in one or more fixed module orientations.

4. The wind turbine farm of claim 1, wherein
each module is defined by a grid having at least one row grid line having at least one steerable wind turbine, wherein
for each at least one row grid line, every steerable wind turbine is positioned at a substantially similar vertical elevation.

5. The wind turbine farm of claim 4, wherein for each at least one row grid line, at least one steerable wind turbine is positioned directly along a corresponding row grid line.

6. The wind turbine farm of claim 5, wherein for each at least one row grid line, at least one additional steerable wind turbine is positioned at an offset distance of the corresponding row grid line.

7. The wind turbine farm of claim 1, wherein
each module is defined by a grid having at least one column grid line corresponding with at least one steerable wind turbine, wherein
for at least one column grid line, every steerable wind turbine is positioned at a substantially different vertical elevation.

8. The wind turbine farm of claim 7, wherein for each at least one column grid line, at least one steerable wind turbine is positioned directly along a corresponding column grid line.

9. The wind turbine farm of claim 8, wherein for each at least one column grid line, at least one additional steerable wind turbine is positioned at an offset distance of the corresponding column grid line.

10. The wind turbine farm of claim 1, wherein one or more steerable wind turbines further comprise one or more monopole structures.

11. The wind turbine farm of claim 1, wherein each of the plurality of steerable wind turbines is vertically steerable.

12. The wind turbine farm of claim 1, wherein each of the plurality of steerable wind turbines is horizontally steerable.

* * * * *